United States Patent
Hwang et al.

(10) Patent No.: US 11,526,770 B2
(45) Date of Patent: Dec. 13, 2022

(54) LATENT COMPUTING PROPERTY PREFERENCE DISCOVERY AND COMPUTING ENVIRONMENT MIGRATION PLAN RECOMMENDATION

(71) Applicant: International Business Machines Corporation, Armonk, NY (US)

(72) Inventors: Jinho Hwang, Ossining, NY (US); Maja Vukovic, New York, NY (US); John Rofrano, Mahopac, NY (US); Anup Kalia, Elmsford, NY (US); Ya Bin Dang, Beijing (CN); Jie Ma, Nanjing (CN); Lijun Mei, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 618 days.

(21) Appl. No.: 16/447,166

(22) Filed: Jun. 20, 2019

(65) Prior Publication Data
US 2020/0401905 A1    Dec. 24, 2020

(51) Int. Cl.
*G06N 5/02* (2006.01)

(52) U.S. Cl.
CPC ..................... *G06N 5/02* (2013.01)

(58) Field of Classification Search
CPC . G06N 5/02; G06N 3/08; G06N 20/10; G06F 2009/4557
See application file for complete search history.

(56) References Cited

U.S. PATENT DOCUMENTS

| | | | |
|---|---|---|---|
| 9,361,092 B1* | 6/2016 | Bai | ......................... H04L 67/34 |
| 9,729,632 B2* | 8/2017 | Bai | ..................... G06F 9/45558 |
| 2006/0026012 A1 | 2/2006 | Campbell | |
| 2008/0005137 A1* | 1/2008 | Surendran | .............. G06N 20/00 |

(Continued)

OTHER PUBLICATIONS

Miel, et al., The NIST Definition of Cloud Computing, National Institute of Standards and Technology Special Publication 800-145, Sep. 2011, 7 Pages.

*Primary Examiner* — Phenuel S Salomon
(74) *Attorney, Agent, or Firm* — Amin, Turocy & Watson, LLP

(57) ABSTRACT

Systems, computer-implemented methods, and computer program products that can facilitate computing environment migration plan recommendation based on one or more latent entity computing property preferences are provided. According to an embodiment, a system can comprise a memory that stores computer executable components and a processor that executes the computer executable components stored in the memory. The computer executable components can comprise an analysis component that employs a model to discover a latent computing property preference of an entity operating in a first computing environment. The computer executable components can further comprise a recommendation component that recommends a computing environment migration plan to a second computing environment based on the latent computing property preference of the entity. In some embodiments, the recommendation component recommends discovered latent computing property preferences of the entity to construct the computing environment migration plan.

25 Claims, 13 Drawing Sheets

(56) References Cited

U.S. PATENT DOCUMENTS

| | | | |
|---|---|---|---|
| 2010/0223276 A1* | 9/2010 | Al-Shameri | G06K 9/0063 707/769 |
| 2012/0323558 A1* | 12/2012 | Nolan | G06F 40/30 704/E11.001 |
| 2013/0091285 A1 | 4/2013 | Devarakonda et al. | |
| 2013/0212200 A1 | 8/2013 | Dennis et al. | |
| 2015/0020059 A1 | 1/2015 | Davis | |
| 2016/0092266 A1* | 3/2016 | Bavishi | G06F 9/505 718/1 |
| 2016/0094477 A1* | 3/2016 | Bai | H04L 47/786 709/226 |
| 2016/0142261 A1* | 5/2016 | Huang | H04L 41/0896 709/223 |
| 2016/0191298 A1* | 6/2016 | Markley | H04L 41/12 709/223 |
| 2017/0126795 A1* | 5/2017 | Kumar | H04L 41/5012 |
| 2017/0286835 A1* | 10/2017 | Ho | G06F 16/367 |
| 2018/0191582 A1 | 7/2018 | Amendjian et al. | |
| 2020/0089515 A1* | 3/2020 | Hari | H04L 41/5029 |
| 2020/0151651 A1* | 5/2020 | Chang | G06Q 10/063112 |
| 2020/0304571 A1* | 9/2020 | Ranjan | G06F 3/0649 |

\* cited by examiner

Inputs: Labeled set $D_l$, unlabeled set $D_u$, number of steps T, number of examples per iteration S
$t = 1$;
*while $t <= T$ do*
   Train a multi-label SVM classifier f based on training data $D_l$
   for each instance x in $D_u$ do
     Predict its label vector y using the LR(loss reduction)-based prediction method
     $D^*_s = \text{argmax}_{D_s} (\sum_{x \in D_s} \sum_{i=1}^{}((1 - y^i f_i(x)) / 2))$
     constrained to $y^i \in \{-1, 1\}$
     (equation for Maximum loss reduction with maximal confidence)
     Calculate the expected loss reduction with the most confident label vector y,
     $\text{score}(x) = \sum_{i=1}^{k} ((1 - y^i f_i(x)) / 2)$
   Sort score(x) in decreasing order for all x in $D_u$
   Select a set of S examples $D^*_s$ with the largest scores (or experienced SME or client input),
   and update the training set $D_l <- D_l + D^*_s$
   end for
   Train the multi-label learner l with $D_l$
   $t = t + 1$;
*end while*

- $f_i(x)$ is a SVM classifier associated with class i
- $x_1..x_n$ data points (e.g. feature vector for patterns – [client interview questions/answers, client source data, target cloud properties, etc.])
- Output: client preferences

FIG. 8

LATENT COMPUTING PROPERTY PREFERENCE DISCOVERY AND COMPUTING ENVIRONMENT MIGRATION PLAN RECOMMENDATION

BACKGROUND

The subject disclosure relates to computing property preferences and computing environment migration plans, and more specifically, to latent computing property preference discovery and computing environment migration plan recommendation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that can facilitate computing environment migration plan recommendation based on one or more latent entity computing property preferences are described.

According to an embodiment, a system can comprise a memory that stores computer executable components and a processor that executes the computer executable components stored in the memory. The computer executable components can comprise an analysis component that employs a model to discover a latent computing property preference of an entity operating in a first computing environment. The computer executable components can further comprise a recommendation component that recommends a computing environment migration plan to a second computing environment based on the latent computing property preference of the entity.

According to another embodiment, a computer-implemented method can comprise employing, by a system operatively coupled to a processor, a model to discover a latent computing property preference of an entity operating in a first computing environment. The computer-implemented method can further comprise recommending, by the system, a computing environment migration plan to a second computing environment based on the latent computing property preference of the entity.

According to another embodiment, a computer program product facilitating computing environment migration plan recommendation based on one or more latent entity computing property preferences is provided. The computer program product comprising a computer readable storage medium having program instructions embodied therewith, the program instructions executable by a processor to cause the processor to employ, by the processor, a model to discover a latent computing property preference of an entity operating in a first computing environment. The program instructions are further executable by the processor to cause the processor to recommend, by the processor, a computing environment migration plan to a second computing environment based on the latent computing property preference of the entity.

According to an embodiment, a system can comprise a memory that stores computer executable components and a processor that executes the computer executable components stored in the memory. The computer executable components can comprise a learner component that learns one or more computing property preference patterns of an entity based on feedback data from the entity corresponding to one or more computing property preferences of the entity. The computer executable components can further comprise an analysis component that employs an artificial intelligence model to discover a latent computing property preference of the entity based on the one or more computing property preference patterns of the entity.

According to another embodiment, a computer-implemented method can comprise learning, by a system operatively coupled to a processor, one or more computing property preference patterns of an entity based on feedback data from the entity corresponding to one or more computing property preferences of the entity. The computer-implemented method can further comprise employing, by the system, an artificial intelligence model to discover a latent computing property preference of the entity based on the one or more computing property preference patterns of the entity.

DESCRIPTION OF THE DRAWINGS

FIG. 8 illustrates an example, non-limiting script that can facilitate computing environment migration plan recommendation based on one or more latent entity computing property preferences in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

With new computing environment architectures and platforms (e.g., cloud architectures and platforms), existing applications and/or services are being migrated with new requirements. Computing environment migration (e.g., cloud migration) requires highly dynamic requirement changes based on the source computing environment and target computing environment. Existing applications and/or services being migrated to newer computing environments need to be adjusted based on the client preferences (e.g., preferences of an entity such as, for instance, a device, a computer, a robot, a machine, an artificial intelligence driven module, a human, etc.). As is often the case, clients (e.g., entities) do not have ideas about what they prefer for the target computing environments (e.g., target cloud computing environments). With the focus on insights, a big challenge is in understanding the latent client preferences (e.g., latent computing property preferences of an entity) and recommending the best computing environment migration plan options for them. Humans cannot process large data sources with consistency. Currently, most of the client preferences (e.g., latent computing property preferences of an entity) are predominantly obtained via subject matter expert (SME) experiences and client (e.g., entity) discussions, requiring a lot of human effort (especially as you consider multiple target environments).

Figure 1:
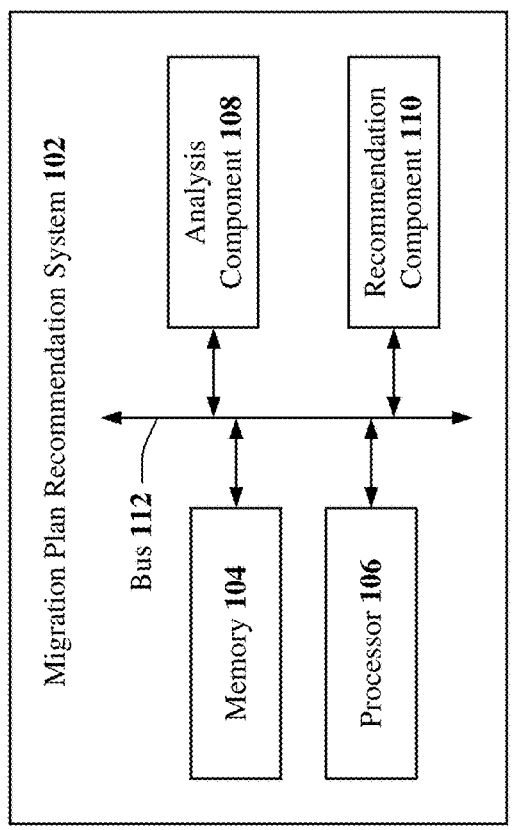
FIG. 1 illustrates a block diagram of an example, non-limiting system that can facilitate computing environment migration plan recommendation based on one or more latent entity computing property preferences in accordance with one or more embodiments described herein.

FIG. 1 illustrates a block diagram of an example, non-limiting system 100 that can facilitate computing environment migration plan recommendation based on one or more latent entity computing property preferences in accordance with one or more embodiments described herein. In some embodiments, system 100 can comprise a migration plan recommendation system 102. In some embodiments, migration plan recommendation system 102 can be associated with a cloud computing environment. For example, migration plan recommendation system 102 can be associated with cloud computing environment 1150 described below with reference to FIG. 11 and/or one or more functional abstraction layers described below with reference to FIG. 12 (e.g., hardware and software layer 1260, virtualization layer 1270, management layer 1280, and/or workloads layer 1290).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Continuing now with FIG. 1, according to several embodiments, system 100 can comprise migration plan recommendation system 102. In some embodiments, migration plan recommendation system 102 can comprise a memory 104, a processor 106, an analysis component 108, a recommendation component 110, and/or a bus 112.

It should be appreciated that the embodiments of the subject disclosure depicted in various figures disclosed herein are for illustration only, and as such, the architecture of such embodiments are not limited to the systems, devices, or components depicted therein. For example, in some embodiments, system 100 and/or migration plan recommendation system 102 can further comprise various computer or computing-based elements described herein with reference to operating environment 1000 and FIG. 10. In several embodiments, such computer or computing-based elements can be used in connection with implementing one or more of the systems, devices, components, or computer-implemented operations shown and described in connection with FIG. 1 or other figures disclosed herein.

According to multiple embodiments, memory 104 can store one or more computer or machine readable, writable, or executable components or instructions that, when executed by processor 106, can facilitate performance of operations defined by the executable component(s) or instruction(s). For example, memory 104 can store computer or machine readable, writable, or executable components or instructions that, when executed by processor 106, can facilitate execution of the various functions described herein relating to migration plan recommendation system 102, analysis component 108, recommendation component 110, and/or another component associated with migration plan recommendation system 102, as described herein with or without reference to the various figures of the subject disclosure.

In some embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to multiple embodiments, processor 106 can comprise one or more types of processors or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or another type of processor. Further examples of processor 106 are described below with reference to processing unit 1014 and FIG. 10. Such examples of processor 106 can be employed to implement any embodiments of the subject disclosure.

In some embodiments, migration plan recommendation system 102, memory 104, processor 106, analysis component 108, recommendation component 110, and/or another component of migration plan recommendation system 102 as described herein can be communicatively, electrically, and/or operatively coupled to one another via a bus 112 to perform functions of system 100, migration plan recommendation system 102, and/or any components coupled therewith. In several embodiments, bus 112 can comprise one or more memory bus, memory controller, peripheral bus, external bus, local bus, and/or another type of bus that can employ various bus architectures. Further examples of bus 112 are described below with reference to system bus 1018 and FIG. 10. Such examples of bus 112 can be employed to implement any embodiments of the subject disclosure.

According to multiple embodiments, migration plan recommendation system 102 can comprise any type of component, machine, device, facility, apparatus, and/or instrument that comprises a processor and/or can be capable of effective and/or operative communication with a wired and/or wireless network. All such embodiments are envisioned. For example, migration plan recommendation system 102 can comprise a server device, a computing device, a general-purpose computer, a special-purpose computer, a quantum computing device (e.g., a quantum computer, a quantum processor, etc.), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

In some embodiments, migration plan recommendation system 102 can be coupled (e.g., communicatively, electrically, operatively, etc.) to one or more external systems, sources, and/or devices (e.g., computing devices, communication devices, etc.) via a data cable (e.g., High-Definition Multimedia Interface (HDMI), recommended standard (RS) 232, Ethernet cable, etc.). In some embodiments, migration plan recommendation system 102 can be coupled (e.g., communicatively, electrically, operatively, etc.) to one or more external systems, sources, and/or devices (e.g., computing devices, communication devices, etc.) via a network.

According to multiple embodiments, such a network can comprise wired and/or wireless networks, including, but not limited to, a cellular network, a wide area network (WAN) (e.g., the Internet), and/or a local area network (LAN). For example, migration plan recommendation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, migration plan recommendation system 102 can thus include hardware (e.g., a central processing unit (CPU), a transceiver, a decoder), software (e.g., a set of threads, a set of processes, software in execution) and/or a combination of hardware and software that facilitates communicating information between migration plan recommendation system 102 and external systems, sources, and/or devices (e.g., computing devices, communication devices, etc.).

In some embodiments, migration plan recommendation system 102 can comprise one or more computer and/or machine readable, writable, and/or executable components and/or instructions that, when executed by processor 106, can facilitate performance of operations defined by such component(s) and/or instruction(s). Further, in some embodiments, any component associated with migration plan recommendation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, analysis component 108, recommendation component 110, and/or any other components associated with migration plan recommendation system 102 as disclosed herein (e.g., communicatively, electronically, and/or operatively coupled with or employed by migration plan recommendation system 102), can comprise such computer and/or machine readable, writable, and/or executable component(s) and/or instruction(s). Consequently, in some embodiments, migration plan recommendation system 102 and/or any components associated therewith as disclosed herein, can employ processor 106 to execute such computer and/or machine readable, writable, and/or executable component(s) and/or instruction(s) to facilitate performance of one or more operations described herein with reference to migration plan recommendation system 102 and/or any such components associated therewith.

In some embodiments, migration plan recommendation system 102 can facilitate performance of operations executed by and/or associated with analysis component 108, recommendation component 110, and/or another component associated with migration plan recommendation system 102 as disclosed herein. For example, as described in detail below, migration plan recommendation system 102 can facilitate (e.g., via processor 106): employing a model to discover a latent computing property preference of an entity operating in a first computing environment; and/or recommending a computing environment migration plan to a second computing environment based on the latent computing property preference of the entity. In some embodiments, migration plan recommendation system 102 can further facilitate (e.g., via processor 106): employing at least one of an artificial intelligence model, a topic model, or a latent Dirichlet allocation model to discover the latent computing property preference of the entity based on data corresponding to the entity comprising at least one of entity interview data, entity source data, entity application configuration data, entity middleware data, entity network data, entity storage device data, entity location data, or entity documentation data; employing the model to map one or more hierarchical topics indicative of one or more latent computing property preferences of the entity to one or more classes indicative of one or more computing properties of the second computing environment using one or more bipartite graphs; recommending the computing environment migration plan based on at least one of a similarity measure between one or more latent computing property preferences of the entity and one or more computing properties of the second computing environment or a maximum support measure comprising a ratio of a number of the one or more latent computing property preferences of the entity that correspond to a computing property of the second computing environment and a total number of the one or more latent computing property preferences of the entity; employing the model to discover one or more latent computing property preferences of the entity based on feedback data from the entity corresponding to the latent computing property preference of the entity or to modify the latent computing property preference of the entity based on the feedback data; and/or recommending the computing environment migration plan based on feedback data from the entity corresponding to the latent computing property preference of the entity.

In some embodiments, migration plan recommendation system 102 can further facilitate (e.g., via processor 106): learning one or more computing property preference patterns of an entity based on feedback data from the entity corresponding to one or more computing property preferences of the entity; and/or employing an artificial intelligence model to discover a latent computing property preference of the entity based on the one or more computing property preference patterns of the entity. In some embodiments, migration plan recommendation system 102 can further facilitate (e.g., via processor 106): recommending a computing environment migration plan from a first computing environment to a second computing environment based on the latent computing property preference of the entity.

As referenced herein, a client can comprise one or more entities. As referenced herein, an entity can comprise one or more devices, one or more computers, one or more robots, one or more artificial intelligence driven modules, the Internet, one or more systems, one or more commercial enterprises, one or more computer programs, one or more machines, machinery, one or more actors, one or more users, one or more customers, one or more humans, one or more clients, and/or another type of entity, referred to herein as an entity or entities depending on the context.

According to multiple embodiments, analysis component 108 can employ one or more models to discover one or more latent computing property preferences of an entity operating in a computing environment. For example, analysis component 108 can employ one or more models including, but not limited to, an artificial intelligence (AI) model, a topic model, a latent Dirichlet allocation (LDA) model, and/or another model that can be utilized by analysis component 108 to discover a latent computing property preference of an entity (e.g., a device, a computer, a robot, a machine, an artificial intelligence driven module, a human, etc.) operating in a computing environment.

In some embodiments, analysis component 108 can employ one or more models (e.g., an AI model(s)) to discover one or more latent computing property preferences of an entity operating in a computing environment including, but not limited to, a legacy computing environment, a cloud computing environment, and/or another computing environment. For example, analysis component 108 can employ one or more models defined above to discover one or more latent computing property preferences of an entity operating in: operating environment 1000 described below with reference to FIG. 10; cloud computing environment 1150 described below with reference to FIG. 11; and/or one or more functional abstraction layers described below with reference to FIG. 12 (e.g., hardware and software layer 1260, virtualization layer 1270, management layer 1280, and/or workloads layer 1290).

In some embodiments, analysis component 108 can discover (e.g., via an AI model) one or more latent computing property preferences that can correspond to one or more computing properties of one or more computing environments (e.g., a legacy computing environment, a cloud computing environment, etc.). For example, analysis component 108 can discover one or more latent computing property preferences that can correspond to one or more computing properties including, but not limited to, resource specifications (e.g., virtual machine size, storage device capacity, etc.), network setups, services, user guides, documentations, supported services, resources, prices, locations, and/or another computing property.

In some embodiments, analysis component 108 can discover (e.g., via an AI model) one or more latent computing property preferences that can comprise and/or be associated with one or more computing property classifications of one or more computing environments (e.g., a legacy computing environment, a cloud computing environment, etc.). For example, analysis component 108 can discover one or more latent computing property preferences that can comprise and/or be associated with one or more computing property classifications including, but not limited to, digital enablement, process simplification and standardization, landscape simplification, simplified and flexible financial reporting, financial consolidation, time to value, time to implement, technical feasibility, phased implementation, and/or another computing property.

In some embodiments, analysis component 108 can employ one or more models (e.g., an AI model(s)) defined above to discover one or more latent computing property preferences of an entity based on data corresponding to the entity. For example, analysis component 108 can employ one or more models defined above to discover one or more latent computing property preferences of an entity based on data corresponding to the entity including, but not limited to, entity interview data, entity source data, entity application configuration data, entity middleware data, entity network data, entity storage device data, entity location data, entity documentation data, and/or other data corresponding to the entity. In some embodiments, such data corresponding to the entity can be collected using data collection component 202, for instance, as described below with reference to FIG. 2.

In some embodiments, to facilitate discovery of one or more latent computing property preferences of an entity, analysis component 108 can employ one or more models (e.g., an LDA, a support vector machine (SVM), etc.) to generate one or more bipartite graphs comprising one or more hierarchical topics indicative of one or more latent computing property preferences of an entity and one or more classes (e.g., computing property classification(s) defined above) indicative of one or more computing properties of a computing environment (e.g., a cloud computing environment). In some embodiments, such hierarchical topics can be determined and/or organized by analysis component 108 based on data corresponding to an entity (e.g., data defined above that corresponds to an entity). For example, analysis component 108 can organize such hierarchical topics according to a hierarchy in which more abstract topics are positioned near the root of the hierarchy and more concrete topics are positioned near the leaves. In some embodiments, to facilitate discovery of one or more latent computing property preferences of an entity, analysis component 108 can employ an LDA model to perform feature extraction, where such an LDA model can extract hidden (e.g., latent) computing property preferences of an entity and/or encode such preferences using topic level features.

In some embodiments, analysis component 108 can employ an LDA model to represent each data unit as a document (e.g., each data unit of data corresponding to an entity) by concatenating each attribute after stop words removal and tokenization. In some embodiments, analysis component 108 can employ an AI model (e.g., an SVM) to train such an LDA model using historical structure (e.g., as described below). In some embodiments, analysis component 108 can infer feature vectors using the trained LDA model for historical structure.

In some embodiments, analysis component 108 (and/or recommendation component 110 as described below) can establish a similarity measure (e.g., a score that can be indicative of a similarity between one or more hierarchical topics and one or more classes) between one or more latent computing property preferences and computing environment properties. In some embodiments, analysis component 108 (and/or recommendation component 110 as described below) can define a maxsup (e.g., as maximum support) as the ratio of the number of latent computing property preferences covered by a computing environment property. In some embodiments, analysis component 108 (and/or recommendation component 110 as described below) can prioritize the latent computing property preferences based on maxsup and similarity, where more support can be higher priority and more similarity (e.g., between one or more hierarchical topics and one or more classes) can be higher priority.

In some embodiments, analysis component 108 can employ one or more models (e.g., an LDA, an SVM, etc.) to generate one or more of such bipartite graphs described above, where such bipartite graph(s) can be used by analysis component 108 to map one or more hierarchical topics indicative of one or more latent computing property preferences of an entity to one or more classes indicative of one or more computing properties of a computing environment. For example, as described below and illustrated in FIG. 6, analysis component 108 can employ an AI model (e.g., an LDA, an SVM, etc.) to generate a bipartite graph 602c to facilitate mapping one or more of such hierarchical topics (e.g., Topics 1, 2, 3, 4 denoted in FIG. 6) indicative of one or more latent computing property preferences of an entity to one or more classes (e.g., Classes 1, 2, 3, 4 denoted in FIG. 6) indicative of one or more computing properties of a computing environment.

In some embodiments, analysis component 108 can employ a support vector machine (SVM) to facilitate generation of such bipartite graph(s) described above and/or mapping such hierarchical topics to such classes described above. For example, analysis component 108 can employ an SVM model to train such classes representing the computing properties of a computing environment described above, where the data corresponding to an entity as defined above can be used to facilitate such training. For instance, analysis component 108 can employ script 802 described below and illustrated in FIG. 8 to generate one or more bipartite graphs and/or to map such hierarchical topics to such classes described above.

In some embodiments, based on such generation of the bipartite graph and mapping hierarchical topics to classes as described above, analysis component 108 can thereby discover one or more latent computing property preferences of an entity that correspond to one or more computing properties of a computing environment based on data corresponding to the entity. Additionally, or alternatively, in some embodiments, for example, as described below with reference to FIGS. 2, 3, 4, 5, 6, and 7, analysis component 108 can employ an AI model (e.g., an LDA, an SVM, etc.) to: discover one or more latent computing property preferences of an entity based on feedback data from the entity corresponding to a latent computing property preference of the entity; and/or modify the latent computing property preference of the entity based on feedback data.

In some embodiments, based on such generation of the bipartite graph and mapping hierarchical topics to classes as described above, migration plan recommendation system 102 can facilitate presenting one or more latent computing property preferences of an entity and/or recommending one or more computing environment migration plans from one or more first computing environments to one or more second computing environments based on one or more latent computing property preferences of an entity. For example, as described below with reference to FIG. 2, migration plan recommendation system 102 can employ interface component 204 to present to an entity one or more latent computing property preferences corresponding to the entity that can be discovered by analysis component 108 as described above. In another example, as described below with reference to recommendation component 110, migration plan recommendation system 102 can employ recommendation component 110 to recommend one or more computing environment migration plans based on one or more latent computing property preferences corresponding to an entity.

As described herein a computing environment migration plan (also referred to herein and/or in the figures as a migration plan) can describe a plan that facilitates the process of transferring application software, data, and/or other computer-based elements to a cloud computing environment. Examples of a migration to a cloud computing environment can include, but are not limited to, a public cloud migration, a cloud-to-cloud migration, a lift-and-shift migration, and/or another migration.

According to multiple embodiments, recommendation component 110 can recommend one or more computing environment migration plans from one or more first computing environments to one or more second computing environments based on one or more latent computing property preferences of an entity. For example, recommendation component 110 can recommend one or more computing environment migration plans from a first legacy computing environment and/or a first cloud computing environment to a second legacy computing environment and/or a second cloud computing environment. For instance, recommendation component 110 can recommend one or more computing environment migration plans from such a first legacy computing environment and/or a first cloud computing environment comprising a first cloud computing environment 1150 described below with reference to FIG. 11 and/or one or more first functional abstraction layers described below with reference to FIG. 12 (e.g., a first hardware and software layer 1260, a first virtualization layer 1270, a first management layer 1280, and/or a first workloads layer 1290). In this example, recommendation component 110 can recommend such one or more computing environment migration plans from such a first legacy computing environment and/or a first cloud computing environment to a second cloud computing environment comprising a second cloud computing environment 1150 described below with reference to FIG. 11 and/or one or more second functional abstraction layers described below with reference to FIG. 12 (e.g., a second hardware and software layer 1260, a second virtualization layer 1270, a second management layer 1280, and/or a second workloads layer 1290).

In some embodiments, recommendation component 110 can recommend one or more computing environment migration plans to migrate from one or more first computing environments (e.g., a first legacy computing environment, a first cloud computing environment) to one or more second computing environments (e.g., a second legacy computing environment, a second cloud computing environment, etc.) based on a quantitative comparison of one or more latent computing property preferences of an entity (e.g., discovered by analysis component 108 as described above) and one or more computing properties and/or computing property classifications of such a computing environment. For example, in some embodiments, recommendation component 110 can recommend a computing environment migration plan to such a second computing environment based on a similarity measure between one or more latent computing property preferences of an entity and one or more computing properties and/or computing property classifications of such a second computing environment. Additionally, or alternatively, in some embodiments, recommendation component 110 can recommend a computing environment migration plan to such a second computing environment based on a maximum support measure comprising a ratio of a number of the one or more latent computing property preferences of the entity that correspond to a computing property and/or computing property classification of the second computing environment and a total number of the one or more latent computing property preferences of the entity.

In some embodiments, recommendation component 110 can recommend one or more computing environment migration plans from one or more first computing environments (e.g., a first legacy computing environment, a first cloud environment, etc.) to one or more second computing environments (e.g., a second legacy computing environment, a second cloud computing environment, etc.) based on feedback data from an entity corresponding to one or more latent computing property preferences of the entity and/or feedback data from an entity corresponding to one or more computing environment migration plans. For example, as described below with reference to FIGS. 2, 3, 4, 5, and 6, interface component 204 can present to an entity one or more latent computing property preferences of the entity (e.g., in the form of a table such as, for instance, table 400 illustrated in FIG. 4) and such an entity can provide feedback data to migration plan recommendation system 102 via interface component 204 that corresponds to such recommendation(s). In another example, as described below with reference to FIGS. 2, 3, 4, 5, and 6, interface component 204 can present to an entity one or more computing environment migration plans (e.g., in the form of a table such as, for instance, table 500 illustrated in FIG. 5) recommended by recommendation component 110 and such an entity can provide feedback data to migration plan recommendation system 102 via interface component 204 that corresponds to such recommendations. In these examples, based on such feedback data from an entity, recommendation component 110 can recommend one or more new computing environment migration plans or one or more revised computing environment migration plans.

Figure 2:
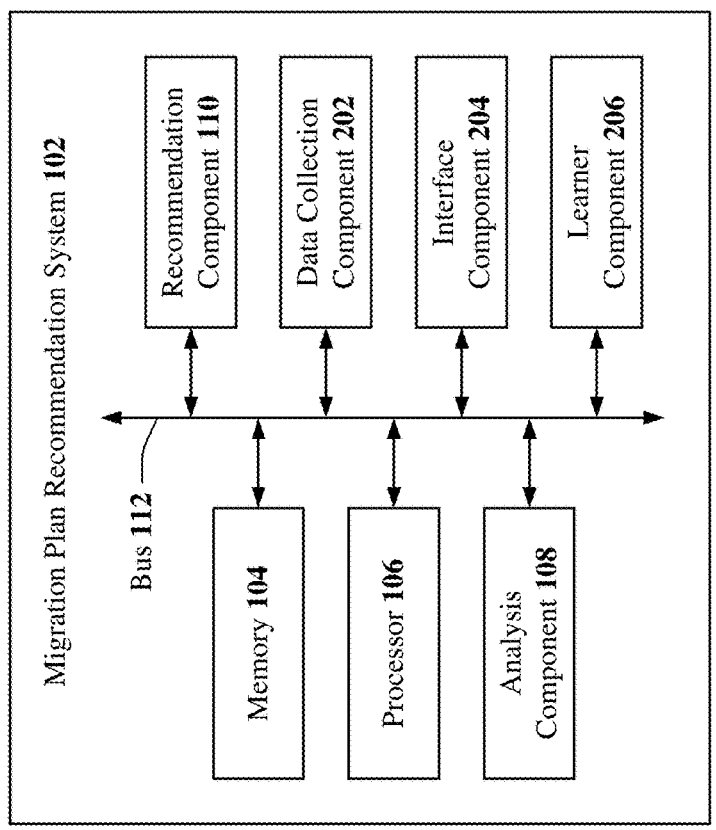
FIG. 2 illustrates a block diagram of an example, non-limiting system that can facilitate computing environment migration plan recommendation based on one or more latent entity computing property preferences in accordance with one or more embodiments described herein.

FIG. 2 illustrates a block diagram of an example, non-limiting system 200 that can facilitate computing environment migration plan recommendation based on one or more latent entity computing property preferences in accordance with one or more embodiments described herein. In some embodiments, system 200 can comprise migration plan recommendation system 102. In some embodiments, migration plan recommendation system 102 can further comprise a data collection component 202, an interface component 204, and/or a learner component 206. Repetitive description of like elements and/or processes employed in respective embodiments is omitted for sake of brevity.

According to multiple embodiments, data collection component 202 can collect data corresponding to an entity (e.g., a device, a computer, a robot, a machine, an artificial intelligence driven module, a human, etc.) and/or one or more computing properties of a computing environment. For example, data collection component 202 can collect data corresponding to such an entity including, but not limited to, entity interview data, entity source data, entity application configuration data, entity middleware data, entity network data, entity storage device data, entity location data, entity documentation data, and/or other data corresponding to the entity. In this example, data collection component 202 can collect such data corresponding to an entity from data sources including, but not limited to, the entity (e.g., answers from the entity to interview questions, input data from the entity, documents from the entity, etc.), a network (e.g., the Internet, an intranet of a company, a database, etc.), a server (e.g., a server of the entity, a third-party server, etc.), and/or another data source.

In some embodiments, data collection component 202 can collect data corresponding to one or more computing properties of a computing environment such as, for instance, a legacy computing environment, a cloud computing environment, and/or another computing environment. For example, data collection component 202 can collect data corresponding to computing properties including, but not limited to, resource specifications (e.g., virtual machine size, storage device capacity, etc.), network setups, services, and/or another computing property. In this example, data collection component 202 can collect data corresponding to such computing properties from, for instance, one or more service providers of such computing environments (e.g., service providers of cloud computing environments).

In some embodiments, data collection component 202 can comprise and/or employ an artificial intelligence (AI) model and/or a machine learning (ML) model to collect (e.g., extract, annotate, etc.) such data described above corresponding to an entity and/or to computing properties of one or more computing environments. In some embodiments, data collection component 202 can store (e.g., via processor 106) collected data on a memory (e.g., memory 104) where it can be retrieved and/or used by any components of migration plan recommendation system 102 (e.g., analysis component 108, recommendation component 110, interface component 204, learner component 206, etc.). For example, such data can be used by analysis component 108 to discover one or more latent computing property preferences of the entity as described above with reference to FIG. 1.

In some embodiments, data collection component 202 can comprise and/or employ an AI and/or a ML model including, but not limited to, a classification model, a probabilistic model, statistical-based model, an inference-based model, a deep learning model, a neural network, long short-term memory (LSTM), fuzzy logic, expert system, Bayesian model, and/or another model that can extract such data described above from such data sources. For example, data collection component 202 can comprise and/or employ an AI model that can utilize, for instance, long short-term memory (LSTM), a reasoning algorithm, natural language annotation, and/or natural language processing (NLP) to extract such data described above from such data sources. In some embodiments, data collection component 202 can collect such data described above from such data sources by executing read and/or write operations using processor 106 to read such data from a data source and/or write such data to a memory (e.g., memory 104) where it can be retrieved and/or used by any components of migration plan recommendation system 102 (e.g., analysis component 108, recommendation component 110, interface component 204, learner component 206, etc.).

According to multiple embodiments, interface component 204 can present to an entity (e.g., a device, a computer, a robot, a machine, an artificial intelligence driven module, a human, etc.) one or more latent computing property preferences of the entity and/or receive feedback data from the entity corresponding to the latent computing property preference of the entity. For example, interface component 204 can comprise an interface component including, but not limited to, an application programming interface (API), a graphical user interface (GUI), and/or another interface component that can present to an entity (e.g., via a computer monitor, a display, a screen, etc.) such one or more latent computing property preferences of the entity and/or receive feedback data from the entity corresponding to the latent computing property preference of the entity. For instance, interface component 204 can comprise an interface component that can present such information to an entity by displaying it on a computer monitor, for example, and/or can receive feedback data from the entity via one or more input controls of interface component 204 (e.g., input controls of a GUI) such as, for example, a text field, a button, a seek bar, a checkbox, a toggle button, a zoom button, and/or another input control.

According to multiple embodiments, learner component 206 can learn one or more computing property preference patterns of an entity (e.g., a device, a computer, a robot, a machine, an artificial intelligence driven module, a human, etc.) based on feedback data from the entity corresponding to one or more computing property preferences of the entity, one or more latent computing property preferences of the entity, and/or one or more computing environment migration plans. For example, based on feedback data received from an entity (e.g., via interface component 204 as described above), learner component 206 can learn one or more computing property preference patterns of an entity, which can be indicative of one or more tendencies of the entity to provide certain feedback data corresponding to certain computing property preference(s), certain latent computing property preference(s), and/or certain computing environment migration(s) presented to the entity. In some embodiments, based on feedback data received from an entity (e.g., via interface component 204 as described above), learner component 206 can learn one or more computing property preference patterns of an entity by learning mapping patterns of hierarchical topics mapped to classes by analysis component 108 as described above with reference to FIG. 1 (e.g., mapping patterns of hierarchical topics indicative of latent computing property preferences of the entity mapped to classes indicative of computing properties of a computing environment using bipartite graphs). In some embodiments, one or more latent computing property preferences of an entity that have been learned by learner component 206 can be defined as a collection of topic-level attributes in which each latent computing property preference can be considered as probability distribution of topics.

In some embodiments, such feedback data received from an entity as described above can comprise historical data corresponding to an entity (e.g., historical computing property preference data, historical computing environment migration plan data, etc.). In some embodiments, learner component 206 can compile such historical data into a historical data index (e.g., a log) that can be stored on a memory device such as, for instance, memory 104 and/or a remote memory device (e.g., a memory device of a remote server).

In some embodiments, such historical data can comprise training data that learner component 206 can use to learn one or more computing property preference patterns of an entity (e.g., a device, a computer, a robot, a machine, an artificial intelligence driven module, a human, etc.) based on feedback data from the entity corresponding to one or more computing property preferences of the entity, one or more latent computing property preferences of the entity, and/or one or more computing environment migration plans. For example, learner component 206 can comprise and/or employ one or more artificial intelligence (AI) models and/or one or more machine learning (ML) models to learn such computing property preference patterns of an entity based on explicit learning and/or implicit learning. For instance, learner component 206 can comprise and/or employ an AI model to learn such computing property preference patterns of an entity based on explicit learning (e.g., supervised learning, reinforcement learning, etc.), where previously obtained historical data corresponding to the entity (e.g., data collected by data collection component 202 as described above) can be used by learner component 206 as training data to learn computing property preference patterns of the entity. In another example, learner component 206 can comprise and/or employ an AI model to learn such computing property preference patterns of an entity based on implicit learning (e.g., unsupervised learning), where such feedback data received from the entity as described above can be used by learner component 206 as training data to learn computing property preference patterns of the entity.

In an embodiment, learner component 206 can learn such computing property preference patterns of an entity based on classifications, correlations, inferences and/or expressions associated with principles of artificial intelligence. For instance, learner component 206 can employ an automatic classification system and/or an automatic classification process to learn computing property preference patterns of the entity based on feedback data received from the entity. In one embodiment, learner component 206 can employ a probabilistic and/or statistical-based analysis (e.g., factoring into the analysis utilities and costs) to learn computing property preference patterns of the entity based on feedback data received from the entity.

In some embodiments, learner component 206 can employ any suitable machine learning based techniques, statistical-based techniques, and/or probabilistic-based techniques to learn computing property preference patterns of an entity based on feedback data received from the entity. For example, learner component 206 can employ an expert system, fuzzy logic, support vector machine (SVM), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or another model. In some embodiments, learner component 206 can perform a set of machine learning computations associated with learning computing property preference patterns of the entity based on feedback data received from the entity. For example, learner component 206 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn computing property preference patterns of the entity based on feedback data received from the entity.

According to multiple embodiments, analysis component 108 can employ an AI model to discover one or more latent computing property preferences of an entity (e.g., a device, a computer, a robot, a machine, an artificial intelligence driven module, a human, etc.) based on one or more computing property preference patterns of the entity. For example, analysis component 108 can employ an AI model (e.g., an LDA, an SVM, etc.) to discover one or more latent computing property preferences of an entity based on such one or more computing property preference patterns of the entity that can be learned by learner component 206 as described above. In this example, recommendation component 110 can recommend (e.g., as described above with reference to FIG. 1) a computing environment migration plan from a first computing environment (e.g., a first legacy computing environment, a first cloud computing environment, etc.) to a second computing environment (e.g., a second legacy computing environment, a second cloud computing environment, etc.) based on the latent computing property preference of the entity that can be discovered by analysis component 108 based on such computing property patterns of the entity learned by learner component 206.

Figure 3:
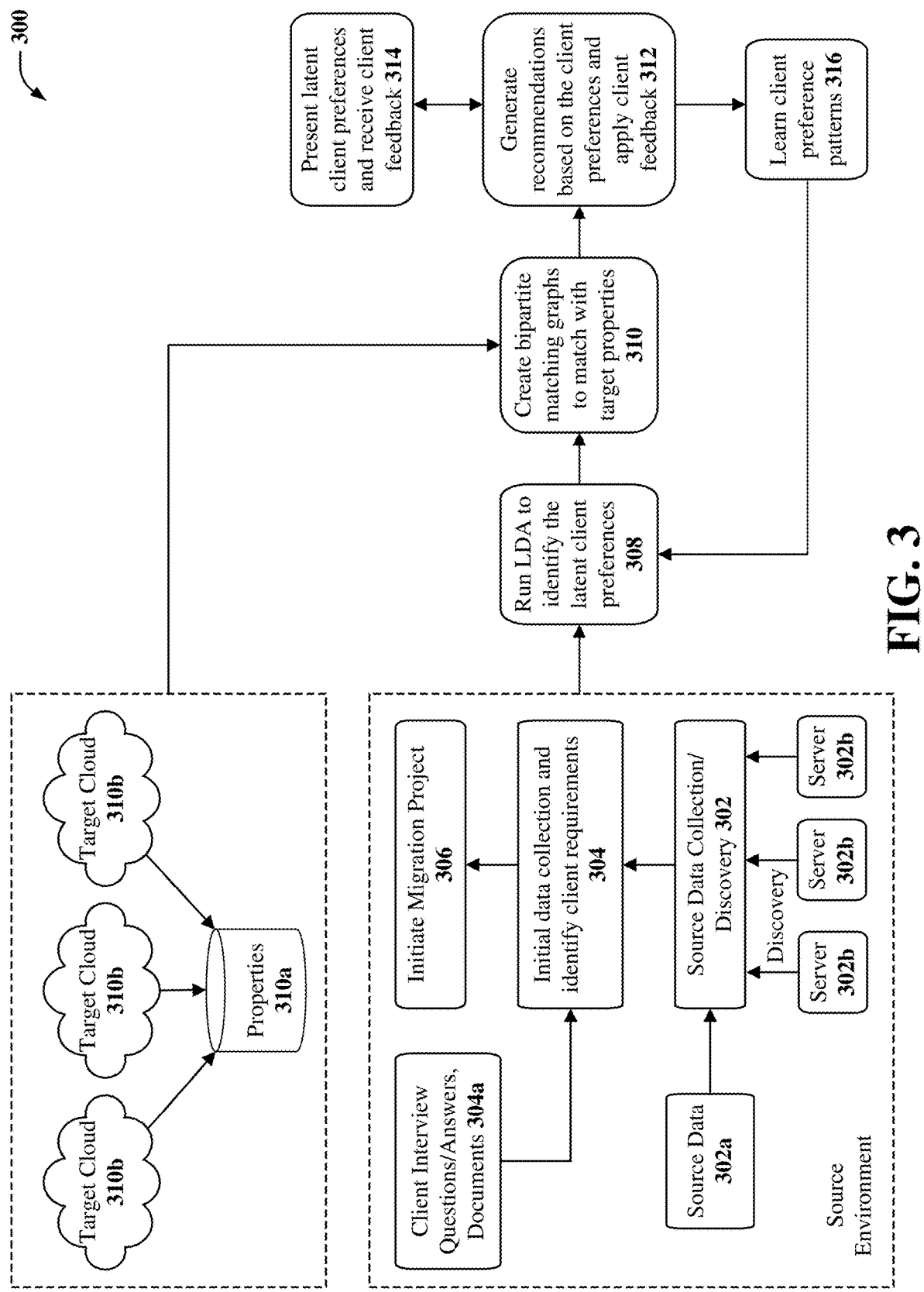
FIG. 3 illustrates a flow diagram of an example, non-limiting computer-implemented method that can facilitate computing environment migration plan recommendation based on one or more latent entity computing property preferences in accordance with one or more embodiments described herein.

FIG. 3 illustrates a flow diagram of an example, non-limiting computer-implemented method 300 that can facilitate computing environment migration plan recommendation based on one or more latent entity computing property preferences in accordance with one or more embodiments described herein. Repetitive description of like elements and/or processes employed in respective embodiments is omitted for sake of brevity.

In some embodiments, at 302, computer-implemented method 300 can comprise source data collection and/or discovery of data corresponding to an entity (e.g., a device, a computer, a robot, a machine, an artificial intelligence driven module, a human, etc.). For example, as described above with reference to FIG. 2, data collection component 202 can collect source data 302a from one or more data sources including, but not limited to, a network, the Internet, an intranet of a company, a database, and/or another data source. In another example, as described above with reference to FIG. 2, data collection component 202 can collect source data (e.g., source data 302a) and/or other data corresponding to an entity (e.g., a device, a computer, a robot, a machine, an artificial intelligence driven module, a human, etc.) from one or more servers 302b. In some embodiments, at 304, computer-implemented method 300 can comprise initial data collection and identification of client requirements (e.g., requirements of an entity such as, for instance, a device, a computer, a robot, a machine, an artificial intelligence driven module, a human, etc.). For example, as described above with reference to FIG. 2, data collection component 202 can collect client (e.g., entity) interview questions, interview answers, and/or documents 304a from, for instance, the client (e.g., the entity). For instance, data collection component 202 can employ interface component 204 described above with reference to FIG. 2 to present, for example, one or more interview questions and/or questionnaire documents to an entity (e.g., a device, a computer, a robot, a machine, an artificial intelligence driven module, a human, etc.). In this example, data collection component 202 can further employ interface component 204 to receive answers from such an entity to such one or more interview questions and/or questionnaire documents. In some embodiments, at 306, computer-implemented method 300 can comprise initiation of migration project 306, which can comprise recommendation of one or more computing environment migration plans based on one or more latent computing property preferences of an entity that can be discovered by analysis component 108 as described below with reference to operations 308, 310, 312, 314, and/or 316.

In some embodiments, at 308, computer-implemented method 300 can comprise running an LDA to identify the latent client preferences (e.g., latent preferences of an entity such as, for instance, a device, a computer, a robot, a machine, an artificial intelligence driven module, a human, etc.). For example, as described above with reference to FIG. 1, analysis component 108 can employ an LDA to discover one or more latent computing property preferences of an entity (e.g., one or more latent computing property preferences of an entity such as, for instance, a device, a computer, a robot, a machine, an artificial intelligence driven module, a human, etc.).

In some embodiments, at 310, computer-implemented method 300 can comprise creating bipartite matching graphs to match with target properties. For example, as described above with reference to FIG. 1, analysis component 108 can employ an LDA and/or an SVM to generate one or more bipartite graphs comprising hierarchical topics indicative of latent computing property preferences of an entity and classes indicative of computing properties such as, for instance, properties 310a of one or more computing environments such as, for instance, target clouds 310b. In this example, as described above with reference to FIG. 1, analysis component 108 can further employ an LDA to map (e.g., match) such one or more latent computing property preferences of an entity that can be discovered by analysis component 108 at operation 308 above to such classes indicative of computing properties such as, for instance, properties 310a of one or more computing environments such as, for instance, target clouds 310b.

In some embodiments, at 312, computer-implemented method 300 can comprise generating one or more recommendations based on the client preferences (e.g., entity preferences) and applying client feedback. For example, as described above with reference to FIGS. 1 and 2, recommendation component 110 can recommend one or more latent computing property preferences and/or one or more computing environment migration plans that can be presented to an entity via interface component 204. In this example, feedback data that can be received from the entity can be applied (e.g., processed, stored, input to an LDA and/or SVM model, etc.) by analysis component 108, recommendation component 110, and/or learner component 206.

In some embodiments, at 314, computer-implemented method 300 can comprise presenting latent client preferences (e.g., entity preferences) and receiving client feedback. For example, as described above with reference to FIG. 2, interface component 204 can present one or more latent computing property preferences and/or one or more computing environment migration plans to an entity. In this example, interface component 204 can further receive from the entity feedback data corresponding to such latent computing property preferences and/or computing environment migration plans that can be presented to the entity as described above.

In some embodiments, at 316, computer-implemented method 300 can comprise learning client preference patterns (e.g., preference patterns of an entity such as, for instance, a device, a computer, a robot, a machine, an artificial intelligence driven module, a human, etc.). For example, as described above with reference to FIGS. 1 and 2, learner component 206 can learn one or more computing property preference patterns of an entity based on feedback data received from the entity corresponding to one or more recommended computing property preferences of the entity, one or more latent computing property preferences of the entity, and/or one or more computing environment migration plans. In this example, at operation 308, analysis component 108 can use such computing property preference pattern(s) of the entity that can be learned by learner component 206 to discover one or more latent computing property preferences of the entity.

Figure 4:
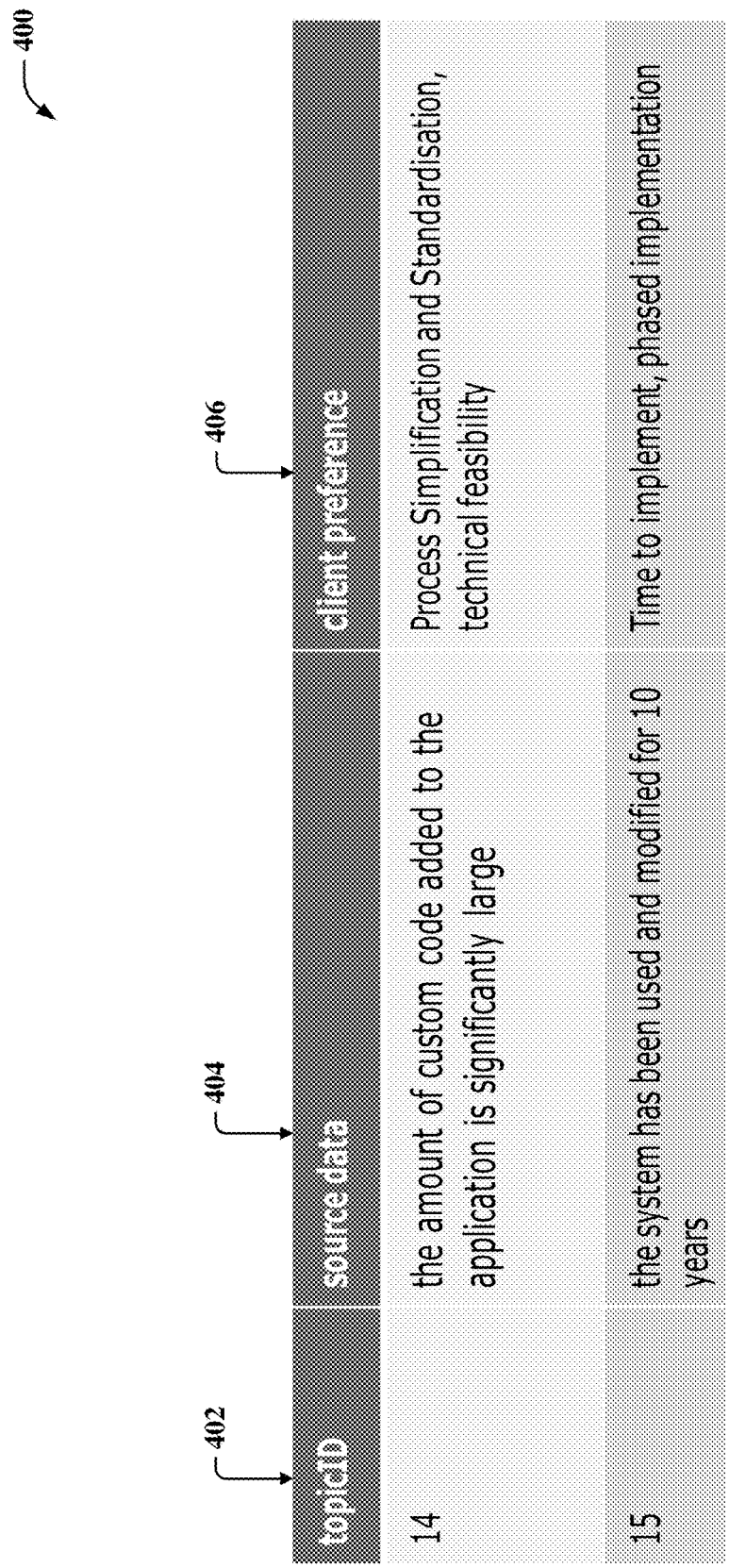
FIG. 4 illustrates an example, non-limiting table that can facilitate computing environment migration plan recommendation based on one or more latent entity computing property preferences in accordance with one or more embodiments described herein.

FIG. 4 illustrates an example, non-limiting table 400 that can facilitate computing environment migration plan recommendation based on one or more latent entity computing property preferences in accordance with one or more embodiments described herein. Repetitive description of like elements and/or processes employed in respective embodiments is omitted for sake of brevity.

According to multiple embodiments, table 400 can comprise a topicID column 402, a source data column 404, and/or a client preference column 406. In some embodiments, topicID column 402 can comprise one or more numerical identifiers (e.g., denoted as 14 and 15 in FIG. 4) of the one or more hierarchical topics of a bipartite graph described above with reference to FIGS. 1 and 2. In some embodiments, source data column 404 can comprise data collected by data collection component 202 from a data source such as, for instance, source data 302a described above with reference to FIGS. 1, 2, and 3. In some embodiments, client preference column 406 can comprise one or more of the latent computing property preferences of an entity that can be discovered by analysis component 108 based on data corresponding to the entity such as, for instance, the data of source data column 404.

In some embodiments, recommendation component 110 can generate table 400 and interface component 204 can present table 400 to an entity. In some embodiments, interface component 204 can further receive feedback data from the entity corresponding to table 400, which analysis component 108, recommendation component 110, and/or learner component 206 can apply (e.g., process, store, input to an LDA and/or SVM model, etc.) as described above with reference to FIGS. 1, 2, and 3. For example, recommendation component 110 can recommend a computing environment migration plan based on such feedback data received from the entity corresponding to table 400.

Figure 5:
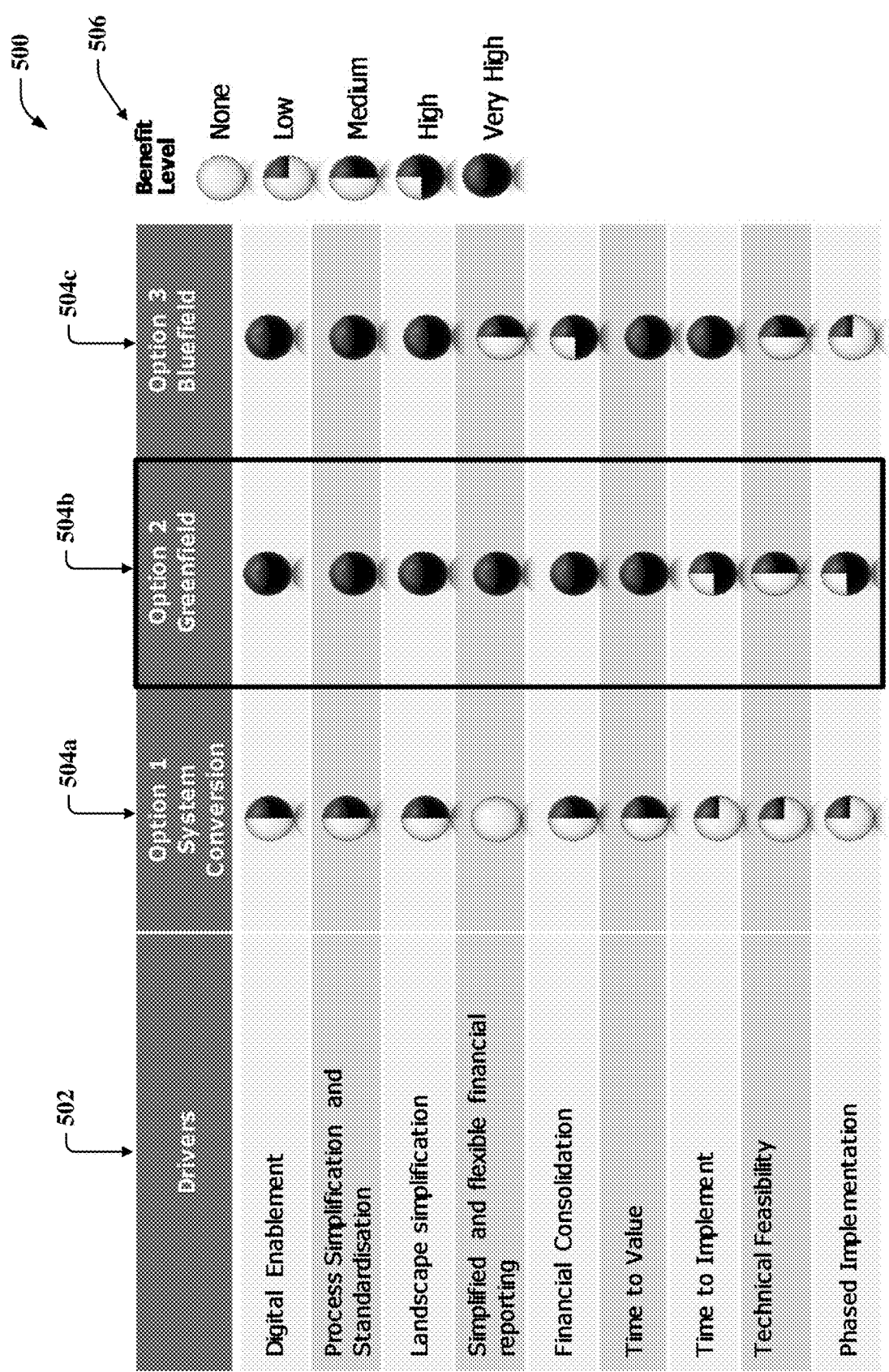
FIG. 5 illustrates an example, non-limiting table that can facilitate computing environment migration plan recommendation based on one or more latent entity computing property preferences in accordance with one or more embodiments described herein.

FIG. 5 illustrates an example, non-limiting table 500 that can facilitate computing environment migration plan recommendation based on one or more latent entity computing property preferences in accordance with one or more embodiments described herein. Repetitive description of like elements and/or processes employed in respective embodiments is omitted for sake of brevity.

According to multiple embodiments, table 500 can comprise a column of drivers 502, one or more columns of computing environment migration plans 504a, 504b, 504c (e.g., migration plans denoted in FIG. 5 as Option 1 System Conversion, Option 2 Greenfield, and/or Option 3 Bluefield, respectively), and/or benefit level designations 506. In some embodiments, drivers 502 can comprise one or more drivers that can comprise the one or more latent computing property preferences of an entity that can be discovered by analysis component 108. In some embodiments, drivers 502 can be used by recommendation component 110 to recommend one or more computing environment migration plans 504a, 504b, 504c. In some embodiments, each computing environment migration plan 504a, 504b, 504c can comprise a benefit level designation 506 corresponding to each driver 502 used by recommendation component 110 to recommend such a plan. In some embodiments, such benefit level designations 506 can indicate a level of benefit an entity can realize with respect to each driver 502 of a certain computing environment migration plan 504a, 504b, 504c. For example, as illustrated in FIG. 5, an entity can realize the most benefit from drivers 502 by implementing computing environment migration plan 504b (e.g., denoted as Option 2 Greenfield in FIG. 5).

In some embodiments, recommendation component 110 can generate table 500 and interface component 204 can present table 500 to an entity. In some embodiments, interface component 204 can further receive feedback data from the entity corresponding to table 500, which analysis component 108, recommendation component 110, and/or learner component 206 can apply (e.g., process, store, input to an LDA and/or SVM model, etc.) as described above with reference to FIGS. 1, 2, and 3. For example, recommendation component 110 can recommend a different computing environment migration plan (e.g., different from computing environment migration plans 504a, 504b, 504c) based on such feedback data received from the entity corresponding to table 500.

Figure 6:
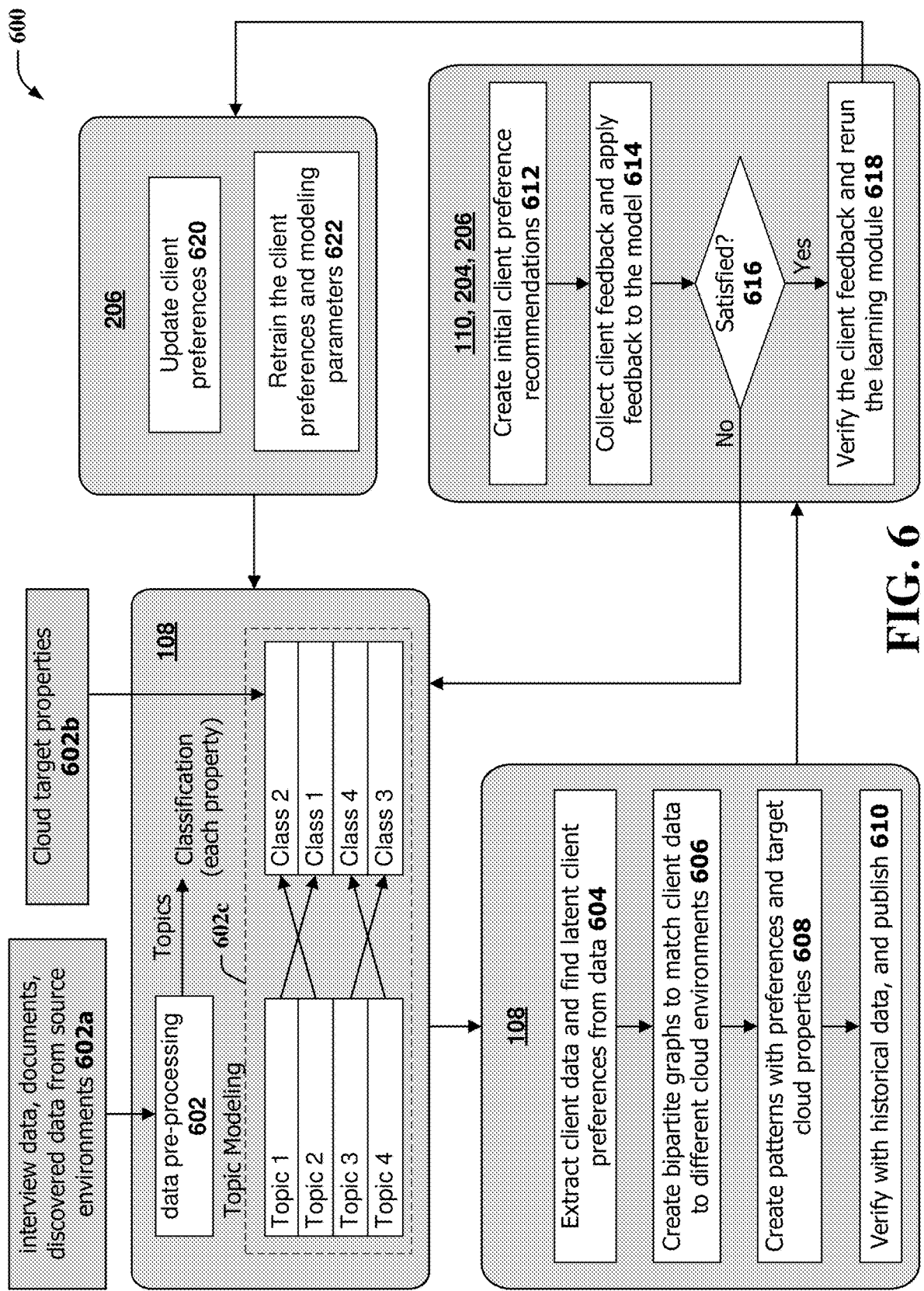
FIG. 6 illustrates a flow diagram of an example, non-limiting computer-implemented method that can facilitate computing environment migration plan recommendation based on one or more latent entity computing property preferences in accordance with one or more embodiments described herein.

FIG. 6 illustrates a flow diagram of an example, non-limiting computer-implemented method 600 that can facilitate computing environment migration plan recommendation based on one or more latent entity computing property preferences in accordance with one or more embodiments described herein. Repetitive description of like elements and/or processes employed in respective embodiments is omitted for sake of brevity.

In some embodiments, at 602, computer-implemented method 600 can comprise pre-processing data. For example, as described above with reference to FIGS. 1, 2, and 3, analysis component 108 can perform (e.g., via an LDA, an SVM, etc.) topic modeling of data corresponding to an entity that can be collected by data collection component 202 and/or classification of computing environment properties of a target computing environment. In some embodiments, as described above with reference to FIGS. 1, 2, and 3, analysis component 108 can perform (e.g., via an LDA, an SVM, etc.) topic modeling of interview data, documents, and/or discovered data from source environments 602a, which can comprise source data 302a, data from one or more servers 302b, and/or client (e.g., entity) interview questions, interview answers, and/or documents 304a. In some embodiments, as described above with reference to FIGS. 1, 2, and 3, analysis component 108 can perform (e.g., via an LDA, an SVM, etc.) classification of cloud target properties 602b, which can comprise properties 310a of one or more target clouds 310b. In some embodiments, as described above with reference to FIGS. 1, 2, and 3, based on such topic modeling and/or classification, analysis component 108 can generate (e.g., via an LDA, an SVM, etc.) bipartite graph 602c by mapping Topics 1, 2, 3, 4 to Classes 1, 2, 3, 4, respectively, as illustrated in FIG. 6.

In some embodiments, at 604, computer-implemented method 600 can comprise extracting client data (e.g., entity data) and finding latent client preferences from data (e.g., via analysis component 108 as described above). In some embodiments, such extracting at operation 604 can comprise feature extraction that can facilitate representation of one or more latent computing property preferences of an entity using topic-level features obtained via, for instance, analysis component 108 by using an LDA model. In some embodiments, at 606, computer-implemented method 600 can comprise creating bipartite graphs (e.g., bipartite graph 602c) to match client data (e.g., entity data) to different cloud environments (e.g., via analysis component 108 as described above). In some embodiments, at 608, computer-implemented method 600 can comprise creating patterns with preferences and target cloud properties (e.g., via analysis component 108 using bipartite graph 602c). In some embodiments, at 610, computer-implemented method 600 can comprise verifying with historical data and publishing (e.g., via analysis component 108, recommendation component 110, and/or learner component 206).

In some embodiments, at 612, computer-implemented method 600 can comprise creating initial client (e.g., entity) preference recommendations (e.g., via recommendation component 110 as described above). In some embodiments, at 614, computer-implemented method 600 can comprise collecting client (e.g., entity) feedback and applying feedback to the model (e.g., via analysis component 108, interface component 204, and/or learner component 206). In some embodiments, at 616, computer-implemented method 600 can comprise determining whether the entity (e.g., the client) is satisfied with the recommendations generated at operation 612. In some embodiments, if it is determined at operation 616 that the entity is not satisfied, computer-implemented method 600 repeats operations 602, 604, 606, 608, 610, 612, and 614 to: collect additional data corresponding to the entity (e.g., via data collection component 202); discover (e.g., via analysis component 108) one or more additional (e.g., different) latent computing property preferences of the entity based on such additional collected data; recommend and/or present such additional latent computing property preferences to the entity (e.g., via recommendation component 110 and/or interface component 204); and/or receive feedback data from the entity corresponding to such additional latent computing property preferences (e.g., via interface component 204). In some embodiments, if it is determined at operation 616 that the entity is satisfied, computer-implemented method 600 continues to operation 618, which can comprise verifying the client (e.g., entity) feedback and rerunning the learning module (e.g., via interface component 204 and/or learner component 206).

In some embodiments, at 620, computer-implemented method 600 can comprise updating (e.g., via analysis component 108 and/or learner component 206) client preferences (e.g., preferences of an entity such as, for instance, a device, a computer, a robot, a machine, an artificial intelligence driven module, a human, etc.). In some embodiments, at 622, computer-implemented method 600 can comprise retraining the client preferences (e.g., entity preferences) and modeling parameters (e.g., via analysis component 108 and/or learner component 206).

In some embodiments, migration plan recommendation system 102 can be associated with various technologies. For example, migration plan recommendation system 102 can be associated with legacy computing environment technologies, cloud computing environment technologies, computing environment migration plan technologies, data analytics technologies, graph analytics technologies, artificial intelligence technologies, machine learning technologies, information retrieval technologies, information extraction technologies, computer technologies, server technologies, information technology (IT) technologies, internet-of-things (IoT) technologies, automation technologies, and/or other technologies.

In some embodiments, migration plan recommendation system 102 can provide technical improvements to systems, devices, components, operational steps, and/or processing steps associated with the various technologies identified above. For example, migration plan recommendation system 102 can automatically (e.g., without assistance from a human): employ (e.g., via analysis component 108) a model (e.g., an AI model, an LDA, an SVM, etc.) to discover a latent computing property preference of an entity (e.g., a device, a computer, a robot, a machine, an artificial intelligence driven module, a human, etc.) operating in a first computing environment (e.g., a first legacy computing environment, a first cloud computing environment, etc.); recommend (e.g., via recommendation component 110) a computing environment migration plan to a second computing environment (e.g., a second legacy computing environment, a second cloud computing environment, etc.) based on the latent computing property preference of the entity; and/or recommend the computing environment migration plan based on feedback data from the entity corresponding to the latent computing property preference of the entity. In this example, by recommending the computing environment migration plan based on such feedback data, migration plan recommendation system 102 can facilitate improved implementation time, accuracy, effectiveness, and/or customization of such a recommended computing environment migration plan, thereby providing technical improvements and/or advantages over existing technologies.

In some embodiments, migration plan recommendation system 102 can provide technical improvements to a processing unit (e.g., processor 106) associated with a classical computing device and/or a quantum computing device (e.g., a quantum processor, quantum hardware, superconducting circuit, etc.). For example, by recommending the computing environment migration plan based on such feedback data from an entity as described above, migration plan recommendation system 102 can facilitate improved implementation time, accuracy, and/or effectiveness of such a recommended computing environment migration plan. In this example, by improving implementation time, accuracy, and/or effectiveness of such a recommended computing environment migration plan, migration plan recommendation system 102 can thereby improve processing time, accuracy, and/or effectiveness (e.g., performance) of a processing unit (e.g., processor 106) associated with migration plan recommendation system 102. For instance, by improving implementation time, accuracy, and/or effectiveness of such a recommended computing environment migration plan, migration plan recommendation system 102 can thereby facilitate reduced processing cycles performed by a processing unit (e.g., processor 106) to implement such a recommended computing environment migration plan.

In some embodiments, migration plan recommendation system 102 can employ hardware or software to solve problems that are highly technical in nature, that are not abstract and that cannot be performed as a set of mental acts by a human. In some embodiments, some of the processes described herein can be performed by one or more specialized computers (e.g., one or more specialized processing units, a specialized quantum computer, etc.) for carrying out defined tasks related to the various technologies identified above. In some embodiments, migration plan recommendation system 102 and/or components thereof, can be employed to solve new problems that arise through advancements in technologies mentioned above, employment of quantum computing systems, cloud computing systems, computer architecture, and/or another technology.

It is to be appreciated that migration plan recommendation system 102 can utilize various combinations of electrical components, mechanical components, and circuitry that cannot be replicated in the mind of a human or performed by a human, as the various operations that can be executed by migration plan recommendation system 102 and/or components thereof as described herein are operations that are greater than the capability of a human mind. For instance, the amount of data processed, the speed of processing such data, or the types of data processed by migration plan recommendation system 102 over a certain period of time can be greater, faster, or different than the amount, speed, or data type that can be processed by a human mind over the same period of time.

According to several embodiments, migration plan recommendation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that migration plan recommendation system 102 can include information that is impossible to obtain manually by a human user. For example, the type, amount, or variety of information included in migration plan recommendation system 102, analysis component 108, recommendation component 110, data collection component 202, interface component 204, and/or learner component 206 can be more complex than information obtained manually by a human user.

Figure 7:
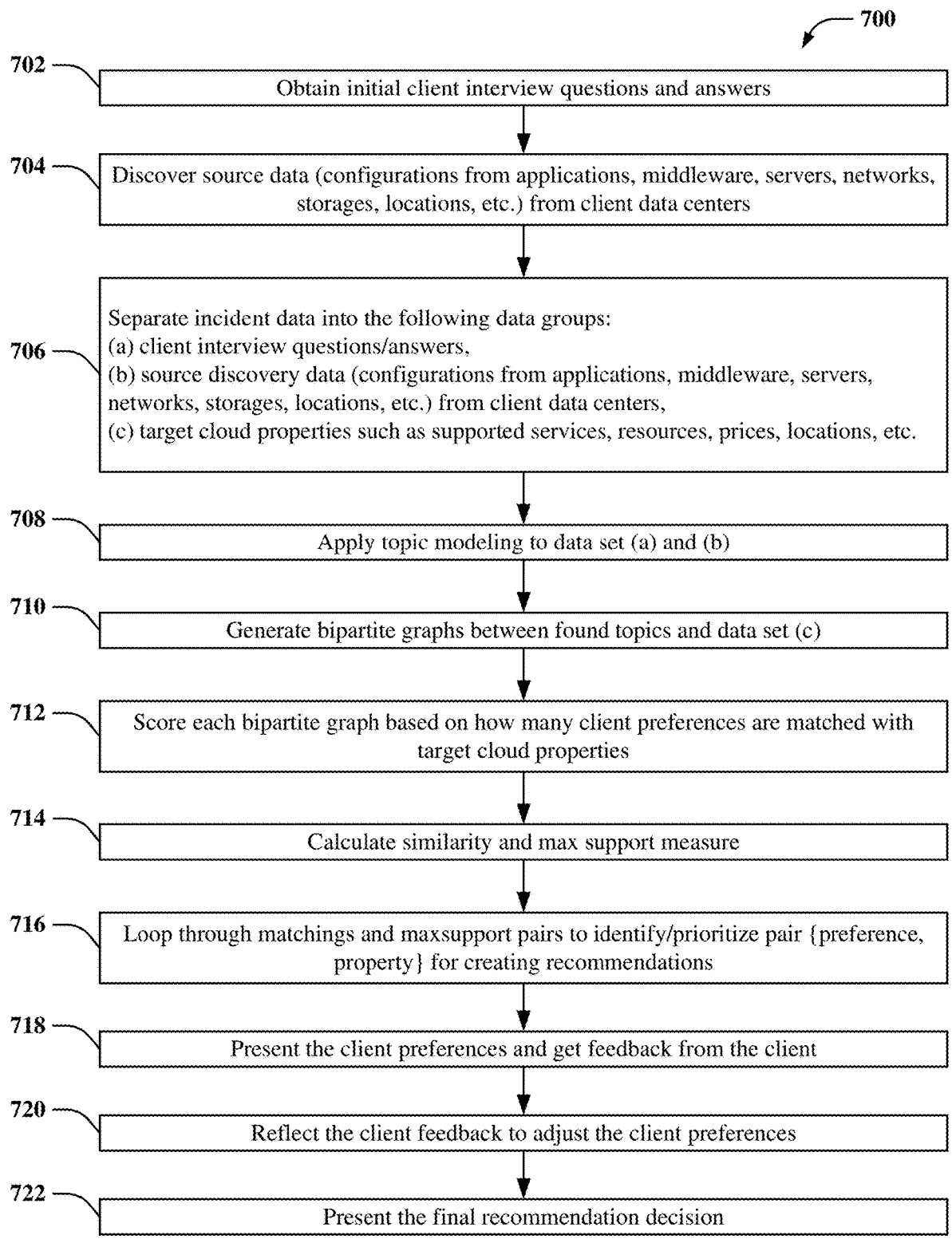
FIG. 7 illustrates a flow diagram of an example, non-limiting computer-implemented method that can facilitate computing environment migration plan recommendation based on one or more latent entity computing property preferences in accordance with one or more embodiments described herein.

FIG. 7 illustrates a flow diagram of an example, non-limiting computer-implemented method 700 that can facilitate computing environment migration plan recommendation based on one or more latent entity computing property preferences in accordance with one or more embodiments described herein. Repetitive description of like elements and/or processes employed in respective embodiments is omitted for sake of brevity.

In some embodiments, at 702, computer-implemented method 700 can comprise obtaining initial client (e.g., entity) interview questions and answers (e.g., via data collection component 202 and/or interface component 204).

In some embodiments, at 704, computer-implemented method 700 can comprise discovering (e.g., via data collection component 202) source data (e.g., configurations from applications, middleware, servers, networks, storages, locations, etc.) from client data centers (e.g., data centers of an entity such as, for instance, a device, a computer, a robot, a machine, an artificial intelligence driven module, a human, etc.).

In some embodiments, at 706, computer-implemented method 700 can comprise separating (e.g., via data collection component 202 and/or analysis component 108) incident data into the following data groups: (a) client (e.g., entity) interview questions and/or answers, (b) source discovery data (e.g., configurations from applications, middleware, servers, networks, storages, locations, etc.) from client (e.g., entity) data centers, and (c) target cloud properties such as supported services, resources, prices, locations, and/or another target cloud property.

In some embodiments, at 708, computer-implemented method 700 can comprise applying (e.g., via analysis component 108) topic modeling to data set (a) and (b) defined above.

In some embodiments, at 710, computer-implemented method 700 can comprise generating (e.g., via analysis component 108) bipartite graphs between found topics and data set (c) defined above.

In some embodiments, at 712, computer-implemented method 700 can comprise scoring (e.g., via analysis component 108 and/or recommendation component 110) each bipartite graph based on how many client preferences (e.g., entity preferences) are matched with target cloud properties.

In some embodiments, at 714, computer-implemented method 700 can comprise calculating similarity and max support measure (e.g., via analysis component 108 and/or recommendation component 110).

In some embodiments, at 716, computer-implemented method 700 can comprise looping through matchings and maxsupport pairs to identify and/or prioritize (e.g., via recommendation component 110) pair {preference, property} for creating recommendations.

In some embodiments, at 718, computer-implemented method 700 can comprise presenting the client preferences (e.g., entity preferences) and getting feedback from the client (e.g., via interface component 204).

In some embodiments, at 720, computer-implemented method 700 can comprise reflecting the client feedback (e.g., feedback from an entity such as, for instance, a device, a computer, a robot, a machine, an artificial intelligence driven module, a human, etc.) to adjust the client preferences (e.g., via analysis component 108, recommendation component 110, interface component 204, and/or learner component 206).

In some embodiments, at 722, computer-implemented method 700 can comprise presenting the final recommendation decision (e.g., via recommendation component 110 and/or interface component 204).

FIG. 8 illustrates an example, non-limiting script 800 that can facilitate computing environment migration plan recommendation based on one or more latent entity computing property preferences in accordance with one or more embodiments described herein. Repetitive description of like elements and/or processes employed in respective embodiments is omitted for sake of brevity.

In some embodiments, script 800 can be executed by one or more components of one or more embodiments of the subject disclosure described herein. In some embodiments, analysis component 108 can execute script 800 to generate one or more bipartite graphs described above and/or to map hierarchical topics (e.g., Topics 1, 2, 3, 4 illustrated in FIG. 6) to classes (e.g., Classes 1, 2, 3, 4 illustrated in FIG. 6). In some embodiments, analysis component 108 can execute script 800 to train such classes representing the computing properties of a computing environment described above, where the data corresponding to an entity as defined above can be used to facilitate such training.

Figure 9A:
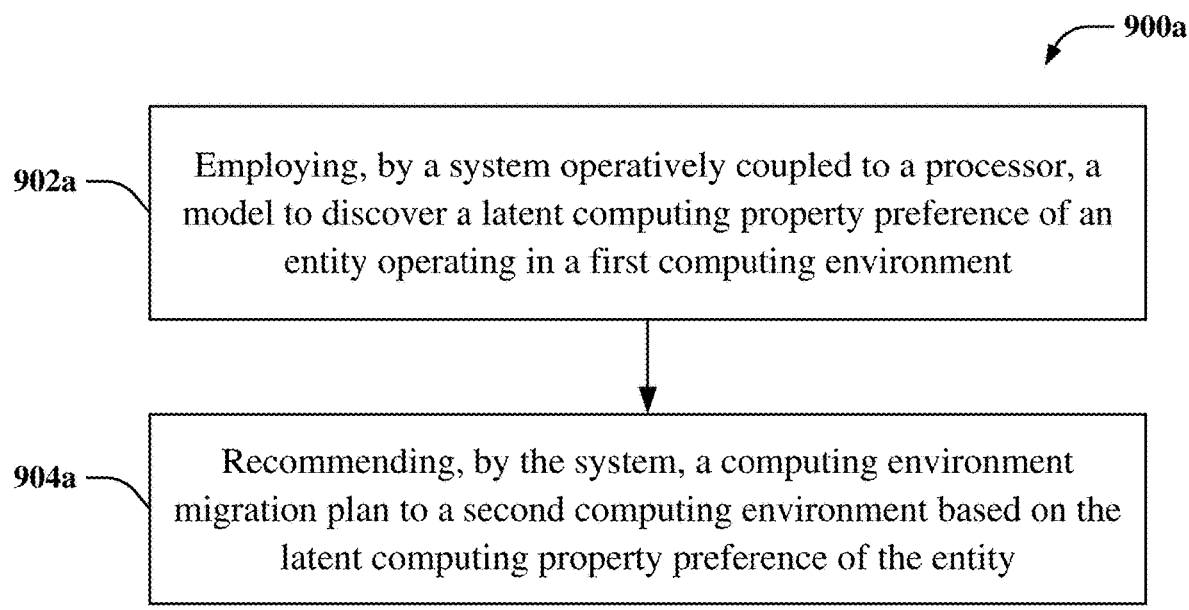
FIG. 9A illustrates a flow diagram of an example, non-limiting computer-implemented method that can facilitate computing environment migration plan recommendation based on one or more latent entity computing property preferences in accordance with one or more embodiments described herein.

FIG. 9A illustrates a flow diagram of an example, non-limiting computer-implemented method 900*a* that can facilitate computing environment migration plan recommendation based on one or more latent entity computing property preferences in accordance with one or more embodiments described herein. Repetitive description of like elements and/or processes employed in respective embodiments is omitted for sake of brevity.

In some embodiments, at 902*a*, computer-implemented method 900*a* can comprise employing, by a system (e.g., via migration plan recommendation system 102 and/or analysis component 108) operatively coupled to a processor (e.g., processor 106), a model (e.g., an AI model, an LDA, an SVM, etc.) to discover a latent computing property preference of an entity (e.g., a device, a computer, a robot, a machine, an artificial intelligence driven module, a human, etc.) operating in a first computing environment (e.g., a first legacy computing environment, a first cloud computing environment, etc.).

In some embodiments, at 904*a*, computer-implemented method 900*a* can comprise recommending, by the system (e.g., via migration plan recommendation system 102, analysis component 108, and/or recommendation component 110), a computing environment migration plan to a second computing environment (e.g., a second legacy computing environment, a second cloud computing environment, etc.) based on the latent computing property preference of the entity.

Figure 9B:
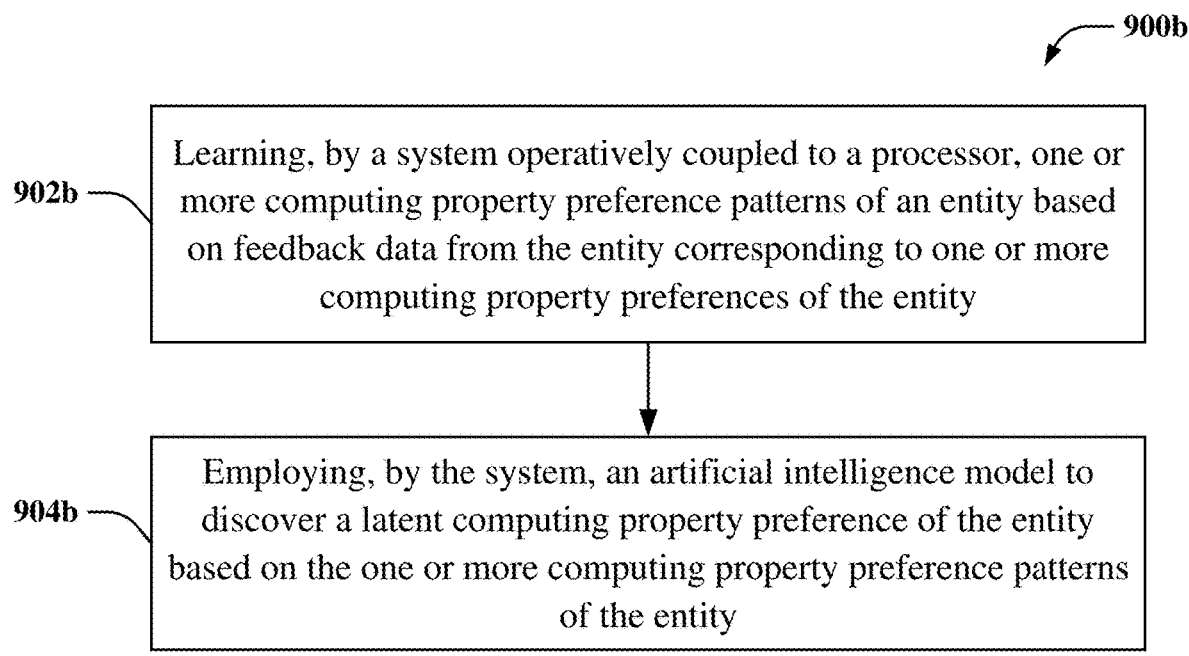
FIG. 9B illustrates a flow diagram of an example, non-limiting computer-implemented method that can facilitate computing environment migration plan recommendation based on one or more latent entity computing property preferences in accordance with one or more embodiments described herein.

FIG. 9B illustrates a flow diagram of an example, non-limiting computer-implemented method 900*b* that can facilitate computing environment migration plan recommendation based on one or more latent entity computing property preferences in accordance with one or more embodiments described herein. Repetitive description of like elements and/or processes employed in respective embodiments is omitted for sake of brevity.

In some embodiments, at 902b, computer-implemented method 900b can comprise learning, by a system (e.g., via migration plan recommendation system 102 and/or learner component 206) operatively coupled to a processor (e.g., processor 106), one or more computing property preference patterns of an entity (e.g., a device, a computer, a robot, a machine, an artificial intelligence driven module, a human, etc.) based on feedback data from the entity corresponding to one or more computing property preferences of the entity (e.g., feedback data received by migration plan recommendation system 102 and/or learner component 206 via interface component 204).

In some embodiments, at 904b, computer-implemented method 900b can comprise employing, by the system (e.g., via migration plan recommendation system 102 and/or analysis component 108), an artificial intelligence model (e.g., an LDA, an SVM, etc.) to discover a latent computing property preference of the entity based on the one or more computing property preference patterns of the entity.

For simplicity of explanation, the computer-implemented methodologies are depicted and described as a series of acts. It is to be understood and appreciated that the subject innovation is not limited by the acts illustrated or by the order of acts, for example acts can occur in various orders or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
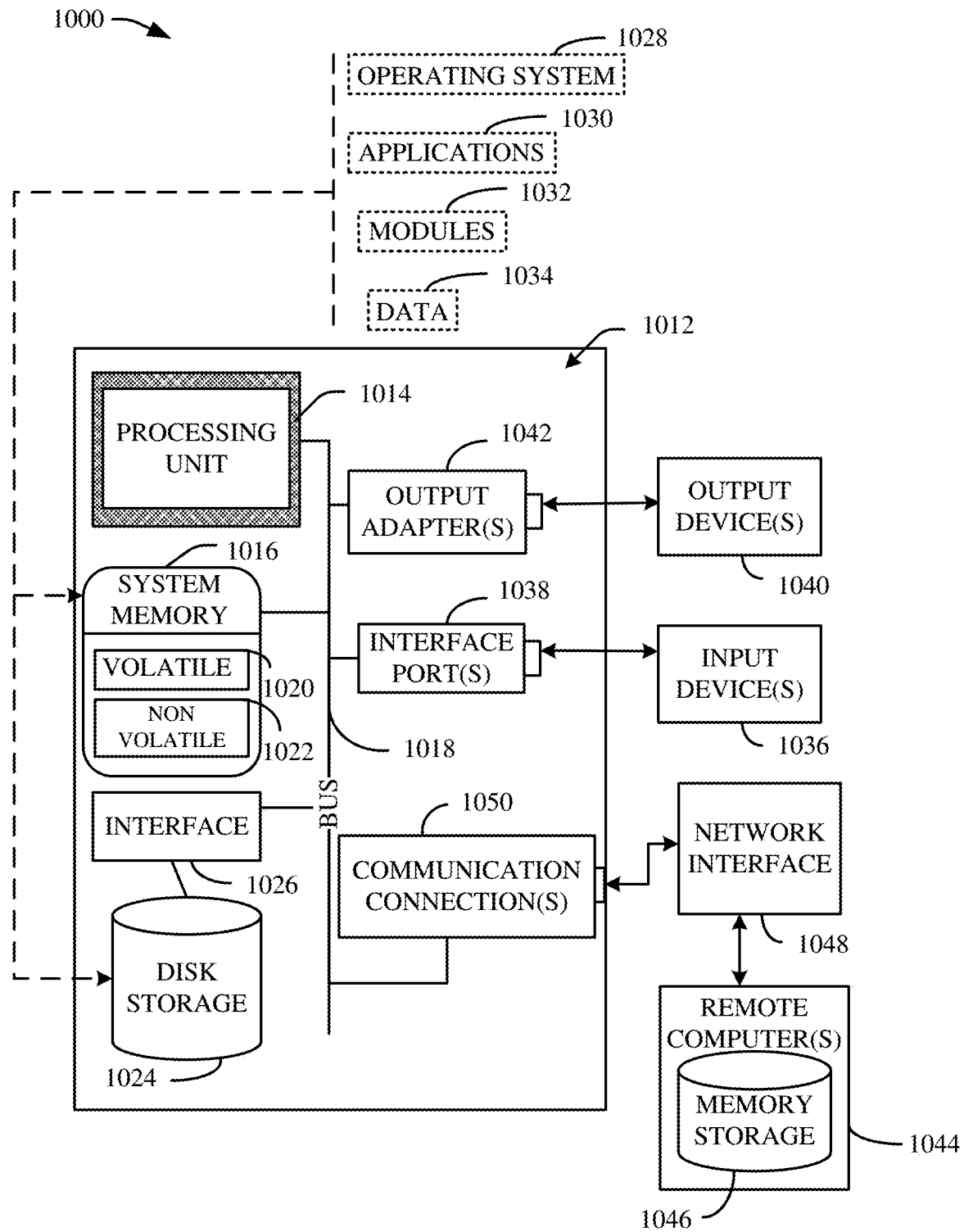
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements and/or processes employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Figure 11:
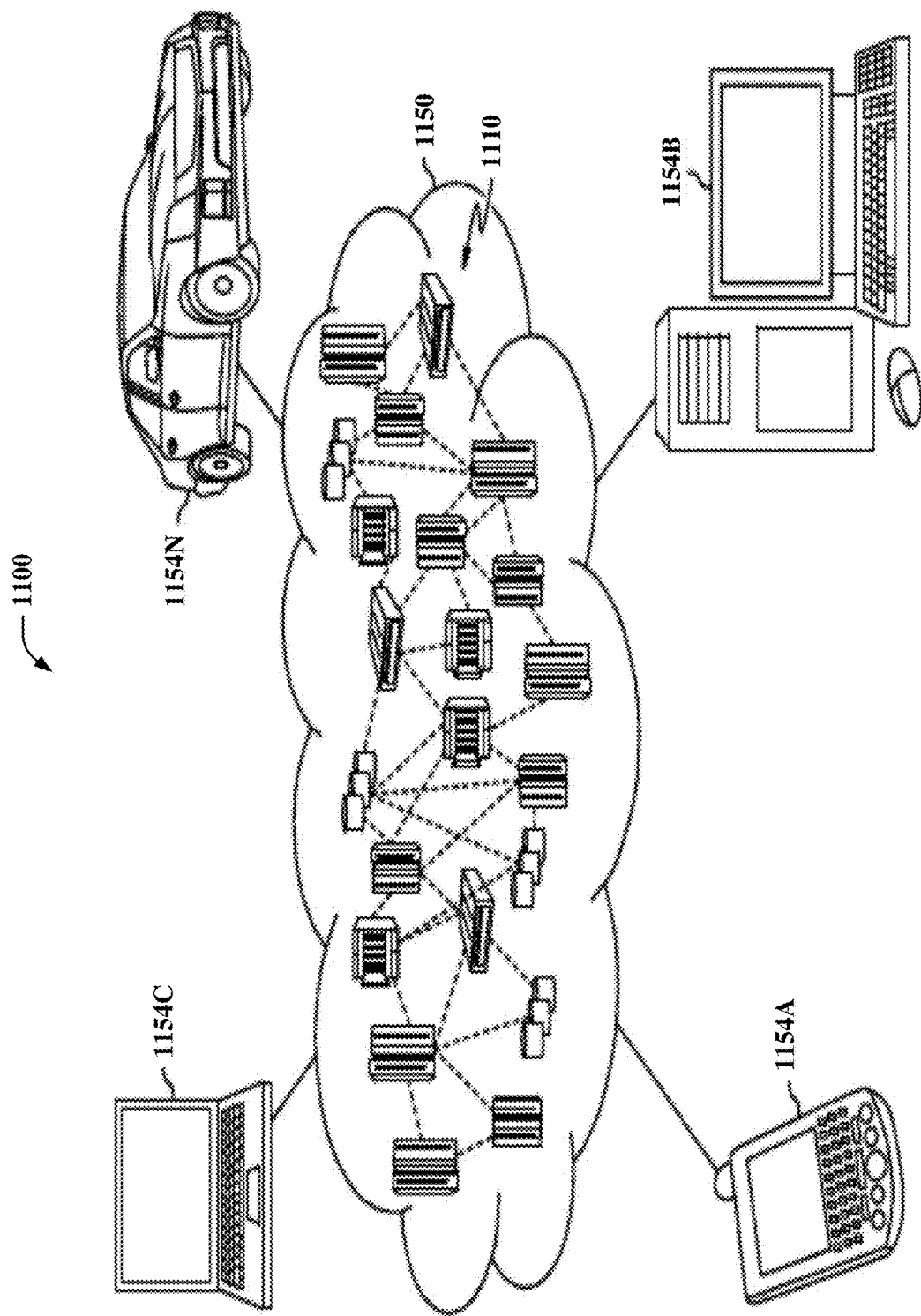
FIG. 11 illustrates a block diagram of an example, non-limiting cloud computing environment in accordance with one or more embodiments of the subject disclosure.

Referring now to FIG. 11, an illustrative cloud computing environment 1150 is depicted. As shown, cloud computing environment 1150 includes one or more cloud computing nodes 1110 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1110 may communicate with one another. They may be grouped (not shown) physically or virtually, in one or more networks, such as Private, Community, Public, or Hybrid clouds as described hereinabove, or a combination thereof. This allows cloud computing environment 1150 to offer infrastructure, platforms and/or software as services for which a cloud consumer does not need to maintain resources on a local computing device. It is understood that the types of computing devices 1154A-N shown in FIG. 11 are intended to be illustrative only and that computing nodes 1110 and cloud computing environment 1150 can communicate with any type of computerized device over any type of network and/or network addressable connection (e.g., using a web browser).

Figure 12:
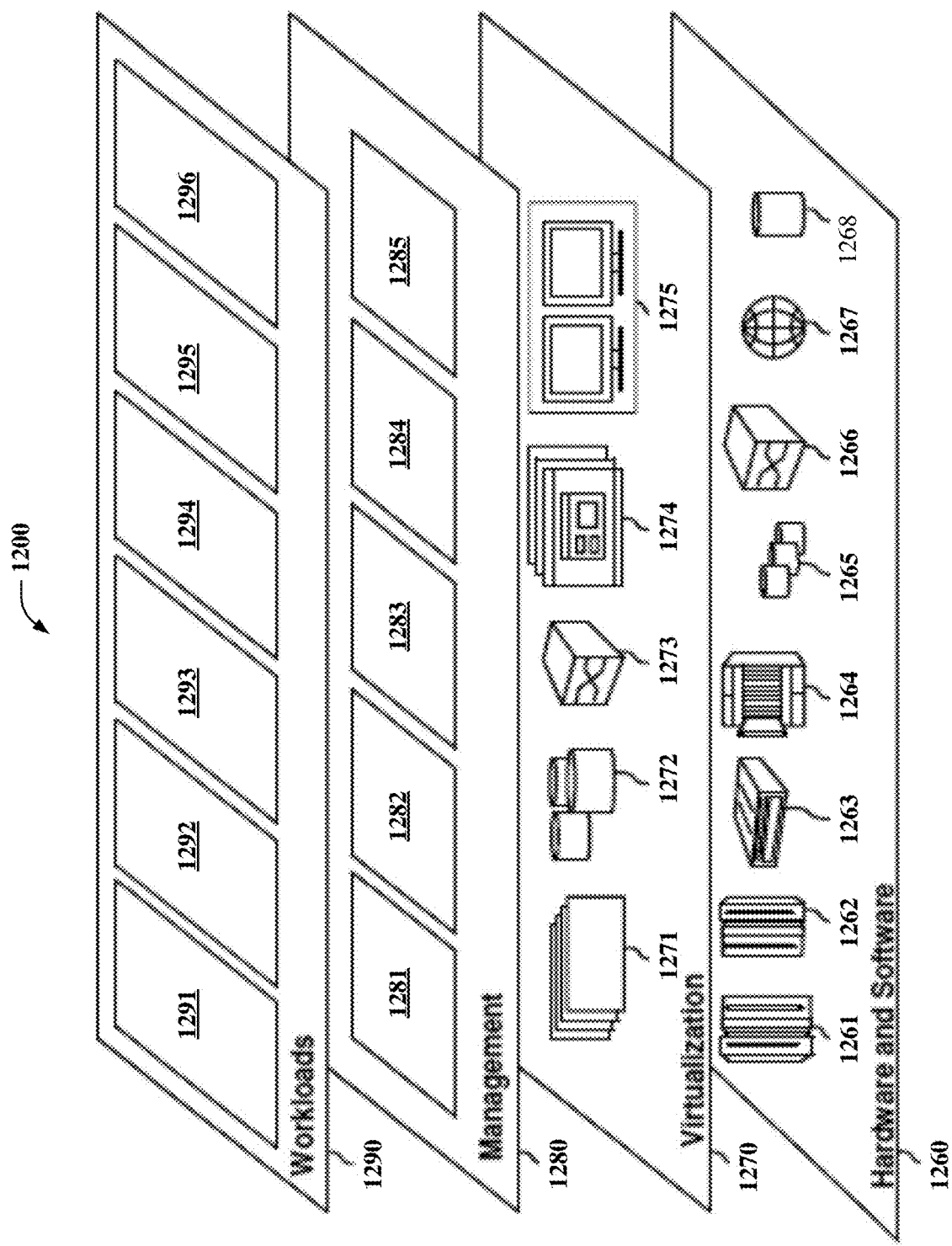
FIG. 12 illustrates a block diagram of example, non-limiting abstraction model layers in accordance with one or more embodiments of the subject disclosure.

Referring now to FIG. 12, a set of functional abstraction layers provided by cloud computing environment 1150 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 1260 includes hardware and software components. Examples of hardware components include: mainframes 1261; RISC (Reduced Instruction Set Computer) architecture based servers 1262; servers 1263; blade servers 1264; storage devices 1265; and networks and networking components 1266. In some embodiments, software components include network application server software 1267 and database software 1268.

Virtualization layer 1270 provides an abstraction layer from which the following examples of virtual entities may be provided: virtual servers 1271; virtual storage 1272; virtual networks 1273, including virtual private networks; virtual applications and operating systems 1274; and virtual clients 1275.

In one example, management layer 1280 may provide the functions described below. Resource provisioning 1281 provides dynamic procurement of computing resources and other resources that are utilized to perform tasks within the cloud computing environment. Metering and Pricing 1282 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1283 provides access to the cloud computing environment for consumers and system administrators. Service level management 1284 provides cloud computing resource allocation and management such that required service levels are met. Service Level Agreement (SLA) planning and fulfillment 1285 provide pre-arrangement for, and procurement of, cloud computing resources for which a future requirement is anticipated in accordance with an SLA.

Workloads layer 1290 provides examples of functionality for which the cloud computing environment may be utilized. Non-limiting examples of workloads and functions which may be provided from this layer include: mapping and navigation 1291; software development and lifecycle management 1292; virtual classroom education delivery 1293; data analytics processing 1294; transaction processing 1295; and migration plan recommendation software 1296.

The present invention may be a system, a method, an apparatus or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network or a wireless network. The network can comprise copper transmission cables, optical transmission fibers, wireless transmission, routers, firewalls, switches, gateway computers or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations or block diagrams of methods, apparatus (systems), and computer program products according to embodiments of the invention. It will be understood that each block of the flowchart illustrations or block diagrams, and combinations of blocks in the flowchart illustrations or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart or block diagram block or blocks. These computer readable program instructions can also be stored in a computer readable storage medium that can direct a computer, a programmable data processing apparatus, or other devices to function in a particular manner, such that the computer readable storage medium having instructions stored therein comprises an article of manufacture including instructions which implement aspects of the function/act specified in the flowchart or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer or computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, or a computer. By way of illustration, both an application running on a server and the server can be a component. One or more components can reside within a process or thread of execution and a component can be localized on one computer or distributed between two or more computers. In another example, respective components can execute from various computer readable media having various data structures stored thereon. The components can communicate via local or remote processes such as in accordance with a signal having one or more data packets (e.g., data from one component interacting with another component in a local system, distributed system, or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" or "exemplary" are utilized to mean serving as an example, instance, or illustration. For the avoidance of doubt, the subject matter disclosed herein is not limited by such examples. In addition, any aspect or design described herein as an "example" or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory that stores computer executable components; and
   a processor that executes the computer executable components stored in the memory, wherein the computer executable components comprise:
   an analysis component that employs a model to discover a latent computing property preference of an entity operating in a first computing environment, wherein the model comprises a latent Dirichlet allocation model; and
   a recommendation component that recommends a computing environment migration plan to a second computing environment based on the latent computing property preference of the entity.

2. The system of claim 1, wherein the model further comprises at least one of an artificial intelligence model or a topic model.

3. The system of claim 1, wherein the analysis component discovers the latent computing property preference of the entity based on data corresponding to the entity comprising at least one of entity interview data, entity source data, entity application configuration data, entity middleware data, entity network data, entity storage device data, entity location data, or entity documentation data.

4. The system of claim 1, wherein the analysis component employs the model to map one or more hierarchical topics indicative of one or more latent computing property preferences of the entity to one or more classes indicative of one or more computing properties of the second computing environment using one or more bipartite graphs.

5. The system of claim 1, wherein the recommendation component recommends the computing environment migration plan based on at least one of: a similarity measure between one or more latent computing property preferences of the entity and one or more computing properties of the second computing environment; or a maximum support measure comprising a ratio of a number of the one or more latent computing property preferences of the entity that correspond to a computing property of the second computing environment and a total number of the one or more latent computing property preferences of the entity.

6. The system of claim 1, wherein the analysis component employs the model to: discover one or more latent computing property preferences of the entity based on feedback data from the entity corresponding to the latent computing property preference of the entity; or modify the latent computing property preference of the entity based on the feedback data.

7. The system of claim 1, wherein the recommendation component recommends the computing environment migration plan based on feedback data from the entity corresponding to the latent computing property preference of the entity, thereby facilitating at least one of improved implementation time, accuracy, effectiveness, or customization of the computing environment migration plan.

8. The system of claim 1, wherein the computer executable components further comprise at least one of:
a data collection component that collects at least one of data corresponding to the entity or one or more computing properties of the second computing environment; or an interface component that presents to the entity the latent computing property preference of the entity and receives feedback data from the entity corresponding to the latent computing property preference of the entity.

9. A computer-implemented method, comprising:
employing, by a system operatively coupled to a processor, a model to discover a latent computing property preference of an entity operating in a first computing environment, wherein the model comprises a latent Dirichlet allocation model; and
recommending, by the system, a computing environment migration plan to a second computing environment based on the latent computing property preference of the entity.

10. The computer-implemented method of claim 9, wherein the model further comprises: at least one of an artificial intelligence model or a topic model.

11. The computer-implemented method of claim 9, wherein the employing comprises:
employing, by the system, the model to discover the latent computing property preference of the entity based on data corresponding to the entity comprising at least one of entity interview data, entity source data, entity application configuration data, entity middleware data, entity network data, entity storage device data, entity location data, or entity documentation data.

12. The computer-implemented method of claim 9, further comprising:

employing, by the system, the model to map one or more hierarchical topics indicative of one or more latent computing property preferences of the entity to one or more classes indicative of one or more computing properties of the second computing environment using one or more bipartite graphs.

13. The computer-implemented method of claim 9, wherein the recommending comprises:
recommending, by the system, the computing environment migration plan based on at least one of: a similarity measure between one or more latent computing property preferences of the entity and one or more computing properties of the second computing environment; or a maximum support measure comprising a ratio of a number of the one or more latent computing property preferences of the entity that correspond to a computing property of the second computing environment and a total number of the one or more latent computing property preferences of the entity.

14. The computer-implemented method of claim 9, further comprising: employing, by the system, the model to discover one or more latent computing property preferences of the entity based on feedback data from the entity corresponding to the latent computing property preference of the entity or to modify the latent computing property preference of the entity based on the feedback data.

15. The computer-implemented method of claim 9, further comprising:
recommending, by the system, the computing environment migration plan based on feedback data from the entity corresponding to the latent computing property preference of the entity, thereby facilitating at least one of improved implementation time, accuracy, effectiveness, or customization of the computing environment migration plan.

16. A computer program product facilitating computing environment migration plan recommendation based on one or more latent entity computing property preferences, the computer program product comprising a computer readable storage medium having program instructions embodied therewith, the program instructions executable by a processor to cause the processor to:
employ, by the processor, a model to discover a latent computing property preference of an entity operating in a first computing environment, wherein the model comprises a latent Dirichlet allocation model; and
recommend, by the processor, a computing environment migration plan to a second computing environment based on the latent computing property preference of the entity.

17. The computer program product of claim 16, wherein the program instructions are further executable by the processor to cause the processor to:
employ, by the processor, at least one of an artificial intelligence model, a topic model, or the latent Dirichlet allocation model to discover the latent computing property preference of the entity based on data corresponding to the entity comprising at least one of entity interview data, entity source data, entity application configuration data, entity middleware data, entity network data, entity storage device data, entity location data, or entity documentation data.

18. The computer program product of claim 16, wherein the program instructions are further executable by the processor to cause the processor to:
employ, by the processor, the model to map one or more hierarchical topics indicative of one or more latent computing property preferences of the entity to one or more classes indicative of one or more computing properties of the second computing environment using one or more bipartite graphs.

19. The computer program product of claim 16, wherein the program instructions are further executable by the processor to cause the processor to:
recommend, by the processor, the computing environment migration plan based on at least one of: a similarity measure between one or more latent computing property preferences of the entity and one or more computing properties of the second computing environment; or a maximum support measure comprising a ratio of a number of the one or more latent computing property preferences of the entity that correspond to a computing property of the second computing environment and a total number of the one or more latent computing property preferences of the entity.

20. The computer program product of claim 16, wherein the program instructions are further executable by the processor to cause the processor to:
employ, by the processor, the model to discover one or more latent computing property preferences of the entity based on feedback data from the entity corresponding to the latent computing property preference of the entity or to modify the latent computing property preference of the entity based on the feedback data.

21. The computer program product of claim 16, wherein the program instructions are further executable by the processor to cause the processor to:
recommend, by the processor, the computing environment migration plan based on feedback data from the entity corresponding to the latent computing property preference of the entity.

22. A system, comprising:
a memory that stores computer executable components; and
a processor that executes the computer executable components stored in the memory, wherein the computer executable components comprise:
a learner component that learns one or more computing property preference patterns of an entity based on feedback data from the entity corresponding to one or more computing property preferences of the entity; and
an analysis component that employs a latent Dirichlet allocation model to discover a latent computing property preference of the entity based on the one or more computing property preference patterns of the entity.

23. The system of claim 22, wherein the computer executable components further comprise:
a recommendation component that recommends a computing environment migration plan from a first computing environment to a second computing environment based on the latent computing property preference of the entity.

24. A computer-implemented method, comprising:
learning, by a system operatively coupled to a processor, one or more computing property preference patterns of an entity based on feedback data from the entity corresponding to one or more computing property preferences of the entity; and
employing, by the system, a latent Dirichlet allocation model to discover a latent computing property preference of the entity based on the one or more computing property preference patterns of the entity.

25. The computer-implemented method of claim 24, further comprising:
recommending, by the system, a computing environment migration plan from a first computing environment to a second computing environment based on the latent computing property preference of the entity.

* * * * *